United States Patent
Wang et al.

(10) Patent No.: US 11,477,130 B2
(45) Date of Patent: Oct. 18, 2022

(54) TRANSMISSION CONTROL METHOD AND APPARATUS

(71) Applicant: HUAWEI TECHNOLOGIES CO., LTD., Guangdong (CN)

(72) Inventors: Fanzhao Wang, Shenzhen (CN); Kai Zheng, Beijing (CN); Jian He, Shenzhen (CN); Hao Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 17/097,794

(22) Filed: Nov. 13, 2020

(65) Prior Publication Data

US 2021/0067457 A1 Mar. 4, 2021

Related U.S. Application Data

(63) Continuation of application No. PCT/CN2019/104343, filed on Sep. 4, 2019.

(30) Foreign Application Priority Data

Sep. 4, 2018 (CN) .......................... 201811025822.X

(51) Int. Cl.
  *H04L 47/34* (2022.01)
  *H04L 1/00* (2006.01)
  *H04L 43/106* (2022.01)

(52) U.S. Cl.
  CPC ............ *H04L 47/34* (2013.01); *H04L 1/0023* (2013.01); *H04L 43/106* (2013.01)

(58) Field of Classification Search
  CPC ....... H04L 1/0023; H04L 1/22; H04L 43/106; H04L 45/24; H04L 47/263; H04L 47/27; H04L 47/28; H04L 47/34
  See application file for complete search history.

(56) References Cited

U.S. PATENT DOCUMENTS

| 9,948,725 | B2 | 4/2018 | Biswas et al. |
| 2008/0062879 | A1 | 3/2008 | Sivakumar et al. |

(Continued)

FOREIGN PATENT DOCUMENTS

| CN | 101656656 A | 2/2010 |
| CN | 101699786 A | 4/2010 |

(Continued)

OTHER PUBLICATIONS

Cao et al., "Receiver-centric Buffer Blocking-aware Multipath Data Distribution in MPTCP-based Heterogeneous Wireless Networks," KSII Transactions on Internet and Information Systems, Oct. 2016, 10(10):4642-4660.

(Continued)

*Primary Examiner* — Pao Sinkantarakorn
(74) *Attorney, Agent, or Firm* — Fish & Richardson P.C.

(57) ABSTRACT

This application describes transmission control methods and devices. One method comprises: sending, by a first device to a second device, first control signaling that instructs the second communications device to send a first group of data packets, the first control signaling comprises a first packet sequence number, a first packet sequence number range, and a first transmission time interval, the first group of data packets correspond to sequence numbers within the first packet sequence number range starting from the first packet sequence number, and the first transmission time interval indicates a time interval for sending data packets of the first group of data packets; and receiving, by the first device from the second device, at least one data packet in the first group of data packets.

19 Claims, 9 Drawing Sheets

(56) References Cited

U.S. PATENT DOCUMENTS

| | | | | |
|---|---|---|---|---|
| 2012/0170445 A1* | 7/2012 | Perumanam | ............ | H04L 65/80 370/216 |
| 2012/0221678 A1* | 8/2012 | Tanaka | ............ | H04L 1/1835 709/217 |
| 2013/0272291 A1* | 10/2013 | Mukherjee | ............ | H04L 1/0071 370/338 |
| 2017/0034545 A1* | 2/2017 | Rozenberg | ............ | H04N 21/2402 |

FOREIGN PATENT DOCUMENTS

| | | |
|---|---|---|
| CN | 101883047 A | 11/2010 |
| CN | 102025601 A | 4/2011 |
| CN | 101594692 B | 5/2011 |
| CN | 104601483 A | 5/2015 |
| CN | 107425943 A | 12/2017 |
| CN | 107872357 A | 4/2018 |

OTHER PUBLICATIONS

Extended European Search Report in European Application No. 19856989.9, dated May 18, 2021, 7 pages.

Montazeri et al., "Homa: a receiver-driven low-latency transport protocol using network priorities," Publication: SIGCOMM '18: Proceedings of the 2018 Conference of the ACM Special Interest Group on Data Communication, Aug. 2018, total 15 pages.

PCT International Search Report and Written Opinion issued in International Application No. PCT/CN2019/104343 on Nov. 27, 2019, 15 pages (with English translation).

Office Action issued in Chinese Application No. 201811025822.X dated Jul. 1, 2021, 15 pages (with English translation).

Office Action issued in Japanese Application No. 2020-566640 dated Jan. 4, 2022, 14 pages (with English translation).

Qualcomm Incorporated, "RLC Status PDU format," 3GPP TSG RAN WG2 ad-hoc 2, R2-1706803, Qingdao, China Jun. 27-30, 2017, 5 pages.

\* cited by examiner

TRANSMISSION CONTROL METHOD AND APPARATUS

CROSS-REFERENCE TO RELATED APPLICATIONS

This application is a continuation of International Application No. PCT/CN2019/104343, filed on Sep. 4, 2019, which claims priority to Chinese Patent Application No. 201811025822.X, filed on Sep. 4, 2018. The disclosures of the aforementioned applications are hereby incorporated by reference in their entireties.

TECHNICAL FIELD

The present disclosure relates to the communications field, and in particular, to a transmission control method and apparatus.

BACKGROUND

In a conventional communication mode, a protocol stack architecture, for example, a common transmission control protocol (TCP), a user datagram protocol (UDP), or a quick UDP internet connection (QUIC), as shown in FIG. 1, proposed by Google® is usually used, where a transmit end makes a decision in the protocol stack architecture. Alternatively, to obtain better transmission performance (for example, can better sense network congestion) in some scenarios, a protocol stack architecture in which a receiving end makes a decision may be used, as shown in FIG. 2.

A device at which a data transmit end or data receive end of one connection is located may be referred to as an endpoint device. In an actual networking structure, the endpoint device may be, for example, a terminal device, a cloud device (for example, a cloud server), or some transmission devices (for example, a cloud proxy server, a load balancer, or a hybrid access gateway). One endpoint device may play different roles in different connections or different time periods. For example, the endpoint device may be a transmit end in one connection, or may be a receive end in another connection. Therefore, in an existing protocol, a protocol stack of two endpoint devices of one connection needs to have a capability of controlling packet transmission. For example, for the protocol stack architecture in which the transmit end makes a decision, all end devices having a capability of sending a packet need to have a capability of controlling packet transmission. To be specific, from a perspective of a device, devices at both ends of the connection need to include a module configured to implement packet control, and dual-end coordination is required for controlling packet transmission. Implementation of the foregoing dual-end control is relatively complex. In many actual service scenarios, protocol upgrading is inconvenient, a response to switching of transmission control algorithms is slow, and control is not flexible enough.

SUMMARY

In view of this, embodiments of the present disclosure provide a transmission control method and apparatus. By using control signaling sent by a device at one end of a connection, a device at the other end does not need to make a decision, and just send a packet based on a parameter carried in the control signaling. Further, once a device at one end is specified to control data transmission, a transmission control algorithm may be implemented by modifying the parameter in the control signaling sent by the device at the one end and a sending order of the control signaling, and the transmission control algorithm may be upgraded and modified. Therefore, it is more convenient to implement, modify, and upgrade the transmission control algorithm.

According to a first aspect, an embodiment of the present disclosure provides a transmission control method. The method includes: sending, by a first device, first control signaling to a second device, where the first control signaling instructs the second device to send a first group of data packets; and receiving, by the first device, at least one data packet from the second device, where the at least one data packet is a data packet in the first group of data packets.

The first control signaling includes a first packet sequence number, a first packet sequence number range, and a first transmission time interval, the first group of data packets are data packets that start from the first packet sequence number within the first packet sequence number range, and the first transmission time interval indicates a time interval for sending the data packets in the first group of data packets.

The method described in the first aspect is performed by a controller, and the controller is a device that sends various control signaling described in this application in one connection. Various control signaling mentioned in the first aspect may be encapsulated in a frame, or may be encapsulated in a packet, or may be encapsulated in a frame and then encapsulated in a packet. A plurality of frames carrying control signaling may be encapsulated in one packet, and one or more pieces of control signaling may be encapsulated in each frame.

The first control signaling is sending control signaling, and is used to instruct the second device to send the first group of data packets.

It should be noted that a transmission time interval is a time-related parameter, and may be indicated by using bandwidth, or may be directly indicated by using a time interval at which an action of sending two packets is performed.

In an implementation, the first control signaling is encapsulated in a handshake packet, and the handshake packet is a packet used in a process in which the first device establishes a connection to the second device. In this way, the sending control signaling may be sent to the second device in a link establishment process, so that the second device can send a data packet as soon as possible. This avoids a problem that: the second device sends a data packet later due to the sending control signaling.

In an implementation, the first control signaling is encapsulated in a first control frame, and the first control frame includes a type field, an initial packet sequence number field, a packet sequence number range field, and a transmission time interval field, where a value of the type field in the first control frame corresponds to a type of the first control signaling, a value of the initial packet sequence number field in the first control frame indicates the first packet sequence number, a value of the packet sequence number range field in the first control frame indicates the range of the packet sequence number of the first group of data packets, and a value of the transmission time interval field in the first control frame indicates the first transmission time interval.

In an implementation, the first control frame further includes a flow identification number field, and a value of the flow identification number field in the first control frame is used to indicate a data flow to which the first group of data packets belong. In an implementation, the first control frame and a fifth control frame are encapsulated in a same packet, fifth control signaling is encapsulated in the fifth control frame, the fifth control frame also includes a flow identification number field, the fifth control signaling is used to instruct the second device to send fifth group of data packets, and a value of the flow identifier field in the fifth control frame is used to indicate a data flow to which the fifth group of data packets belong.

In this way, by using control signaling sent by a device at one end of a connection, a device at the other end does not need to make a decision, and only needs to send a packet based on a parameter carried in the control signaling. It should be understood that, after receiving the first control signaling, the second device sends the first group of data packets based on an indication of the first control signaling. However, due to a transmit delay and a transmission delay, the first group of data packets do not arrive at the same time or successively arrive at a transmission time interval at the first device, and this may cause out-of-order or a packet loss. Therefore, the first device receives one or more data packets in the first group of data packets. In addition, in the following implementation, the first device continues to send another control signaling, to intensify control.

In an implementation, the first device sends second control signaling based on a received first data packet.

A packet sequence number of the first data packet is the largest in the at least one data packet, the second control signaling instructs the second device to send a second group of data packets, the second control signaling includes a second packet sequence number, a range of the second packet sequence number, and a second transmission time interval, the second group of data packets are data packets within the second packet sequence number range starting from the second packet sequence number, the second transmission time interval indicates a time interval for sending the data packets in the second group of data packets, and the second packet sequence number is greater than the packet sequence number of the first data packet.

In this way, the first device does not wait for all the first group of data packets to be received before sending new control signaling, so that more flexible and effective control can be performed on sending of a peer end. In some implementations, there may be a specific condition for triggering sending of the second control signaling. These conditions are diversified and may be the following: all the first group of data packets are still not received after a time; it is specified that one piece of control signaling is sent each time several data packets are received; and so on.

In an implementation, after the receiving at least one data packet from the second device, the method further includes: sending, by the first device, third control signaling to the second device, where the third control signaling includes the first packet sequence number; and receiving, by the first device, a response to the third control signaling from the second device, where the response to the third control signaling includes the first packet sequence number and information about at least one to-be-sent data packet that starts from the first packet sequence number.

In an implementation, the response to the third control signaling further includes: information about a plurality of sent data packets that start from the first packet sequence number. The information about the plurality of unsent or sent data packets may be a sequence number of the data packet, or may be a quantity of the data packets.

In this way, the first device may instruct the second device to feed back a sending status of the first group of data packets, to track, in real time, a case in which the peer device sends a packet. In this way, the first device may adjust a parameter in subsequent control signaling in a timely manner based on feedback information. The foregoing several control signaling and responses to the control signaling may be used to perform a sending control part in this application. Control signaling that carries different parameters or that is sent in different conditions can implement various transmission control algorithms used for sending data. In an implementation, the first device stores code corresponding to different transmission control algorithms, and code corresponding to each transmission control algorithm includes a plurality of pieces of control signaling. Code corresponding to one transmission control algorithm is used to describe a condition and an order in which the control signaling is performed, and describe how to modify parameters in these control signaling, to perform a corresponding transmission control algorithm.

In an implementation, the method further includes: sending, by the first device, a third group of data packets to the second device, where the third group of data packets are data packets that start from a third packet sequence number within a third packet sequence number range; sending, by the first device, fourth control signaling to the second device, where the fourth control signaling includes the third packet sequence number, the third packet sequence number range, and a timestamp, and the timestamp is a system time at which the first device sends the fourth control signaling; and receiving, by the first device, a response to the fourth control signaling from the second device, where the response to the fourth control signaling includes the timestamp, and the response to the fourth control signaling further includes information about a data packet that is received or not received, wherein the data packet is a data packet in the third group of data packets.

The information about a data packet that is received or not received, wherein the data packet is a data packet in the third group of data packets may be a quantity of data packets or a sequence number of the data packet, or may be information about data blocks corresponding to the data packets, for example, a quantity or sequence numbers of the data blocks.

In this way, reception control on the peer device can be implemented, that is, control of a time at which the peer device returns feedback to a receiving status of a data packet. Therefore, with reference to the sending control described above, packet transmission is controlled.

In an implementation, the fourth control signaling is encapsulated in a fourth control frame, the fourth control frame includes a type field, an initial packet sequence number field, a packet sequence number range field, and a timestamp field, where a value of the type field in the fourth control frame corresponds to a type of the fourth control signaling, a value of the initial packet sequence number field in the fourth control frame indicates the third packet sequence number, and a value of the packet sequence number range field in the fourth control frame indicates a range of the packet sequence numbers of the third group of data packets.

In an implementation, the first group of data packets, the second group of data packets, and the third group of data packets each carry a first flow identifier number, the first control signaling, the second control signaling, the third control signaling, and the fourth control signaling, and a packet in which the response to the third control signaling is located and a packet in which the response to the fourth control signaling is located each carry a second flow identifier number.

In an implementation, the method further includes: sending, by the first device, first negotiation signaling to the second device, where the first negotiation signaling includes a transmission parameter and a role parameter of the first device, the transmission parameter of the first device indicates a transmission capability of the first device, and the role parameter indicates that the first device controls packet transmission; and receiving, by the first device, second negotiation signaling from the second device, where the second negotiation signaling includes a transmission parameter and a role parameter of the second device, the transmission parameter of the second device indicates a transmission capability of the second device, and the role parameter indicates that the second device does not control packet transmission; and the first device controls packet transmission based on the transmission parameter of the first device, the role parameter of the first device, the transmission parameter of the second device, the role parameter of the second device, and a negotiation rule.

According to a second aspect, an embodiment of this application describes a transmission control method, and the method includes: establishing, by a first device, a connection to a second device, where the connection corresponds to a plurality of paths; sending, by the first device, a first packet to the second device on a first path in the plurality of paths, where the first packet includes a dual-path identifier; when the dual-path identifier indicates that a packet transmission mode is single-path transmission, receiving, by the first device on the first path, a packet sent by the second device; or when the dual-path identifier indicates that a packet transmission mode is multipath transmission, receiving, by the first device on each of the plurality of paths, a packet sent by the second device.

The multipath transmission is either redundant transmission or aggregated transmission. The dual-path identifier is used to indicate the packet transmission mode of the connection. In this way, in a multipath transmission scenario, a manner of sending data may be indicated to a peer device by using the dual-path identifier.

According to a third aspect, an embodiment of this application describes a transmission control method, and the method includes: receiving, by a second device, first control signaling from a first device, where the first control signaling includes a first packet sequence number, a first packet sequence number range, and a first transmission time interval; and sending, by the second device, at least one first data packets to the first device based on the first control signaling at the first transmission time interval, where the plurality of first data packets are data packets within the first packet sequence number range starting from the first packet sequence number.

The method described in the third aspect corresponds to the method described in the first aspect, except that the third aspect is described from a perspective of the second device. Therefore, for various implementations, descriptions, and beneficial effects of the third aspect, refer to the descriptions in the first aspect.

According to a fourth aspect, an embodiment of this application describes a transmission control method, where a connection between a first device and a second device corresponds to a plurality of paths, and the method includes: receiving, by the second device, a first packet from the first device on a first path in the plurality of paths, where the first packet includes a dual-path identifier, and the dual-path identifier is used to indicate a packet transmission mode of the connection; and when the dual-path identifier indicates that the packet transmission mode is single-path transmission, sending, by the second device, a packet to the first device on the first path; or when the dual-path identifier indicates that the packet transmission mode is multipath transmission, sending, by the second device, a packet to the first device on each of the plurality of paths.

The multipath transmission is either redundant transmission or aggregated transmission. The dual-path identifier is used to indicate the packet transmission mode of the connection. In this way, in a multipath transmission scenario, a manner of sending data may be indicated to a peer device by using the dual-path identifier.

According to a fifth aspect, an embodiment of this application describes a transmission control apparatus, and the apparatus includes: a control module, where the control module is configured to generate first control signaling; a sending module, where the sending module is configured to send first control signaling to a second device, where the first control signaling instructs the second device to send a first group of data packets, the first control signaling includes a first packet sequence number, a first packet sequence number range, and a first transmission time interval, the first group of data packets are data packets within the first packet sequence number range starting from the first packet sequence number, and the first transmission time interval indicates a time interval for sending the data packets in the first group of data packets; and a receiving module, where the receiving module is configured to receive at least one data packet from the second device, where the at least one data packet is a data packet in the first group of data packets.

In an implementation, the control module is further configured to deliver the first control signaling to the sending module by using an interface function.

The apparatus described in the fifth aspect may perform the method described in the first aspect. Because the apparatus described in the fifth aspect corresponds to the method described in the first aspect, for various implementations, descriptions, and beneficial effects of the fifth aspect, refer to the descriptions in the first aspect.

According to a sixth aspect, an embodiment of this application describes a transmission control apparatus, where the apparatus is located in a first device, and a connection between the first device and a second device corresponds to a plurality of paths. The apparatus includes: a control module, where the control module is configured to generate a first packet, and the first packet includes a dual-path identifier; a sending module, where the sending module is configured to send the first packet to the second device on a first path in the plurality of paths; and a receiving module, where the receiving module is configured to: when the dual-path identifier indicates that a packet transmission mode is single-path transmission, receive, on the first path, a packet sent by the second device; or when the dual-path identifier indicates that a packet transmission mode is multipath transmission, receive, on each of the plurality of paths, a packet sent by the second device.

The multipath transmission is either redundant transmission or aggregated transmission. In this way, in a multipath transmission scenario, a manner of sending data may be indicated to a peer device by using the dual-path identifier.

In an implementation, the control module is further configured to deliver the first packet to the sending module by using an interface function.

According to a seventh aspect, an embodiment of this application describes a transmission control apparatus, where the apparatus includes a receiving module and a sending module, where the receiving module is configured to receive first control signaling from a first device, and the first control signaling includes a first packet sequence number, a first packet sequence number range, and a first transmission time interval; and the sending module is configured to send at least one first data packets to the first device based on the first control signaling at the first transmission time interval, where the plurality of first data packets are data packets within the first packet sequence number range that start from the first packet sequence number.

The seventh aspect describes the apparatus corresponding to the method in the third aspect. The method described in the third aspect corresponds to the method described in the first aspect, except that the third aspect is described from a perspective of the second device. Therefore, for various implementations, descriptions, and beneficial effects of the seventh aspect, refer to the description in the first aspect.

According to an eighth aspect, an embodiment of this application describes a transmission control apparatus, where the apparatus is located in a second device, a connection between a first device and the second device corresponds to a plurality of paths, and the apparatus includes a receiving module and a sending module, where the receiving module is configured to receive a first packet from the first device on a first path in the plurality of paths, the first packet includes a dual-path identifier, and the dual-path identifier is used to indicate a packet transmission mode of the connection; and the sending module is configured to: when the dual-path identifier indicates that the packet transmission mode is single-path transmission, send, by the second device, a packet to the first device on the first path; or when the dual-path identifier indicates that the packet transmission mode is multipath transmission, send, by the second device, a packet to the first device on each of the plurality of paths.

The multipath transmission is either redundant transmission or aggregated transmission. In this way, in a multipath transmission scenario, a manner of sending data may be indicated to a peer device by using the dual-path identifier.

According to a ninth aspect, an embodiment of this application describes a transmission control device, where the device includes a processing circuit, a communications interface, and a storage medium, where the storage medium stores an instruction, the communications interface is configured to perform information exchange with another device based on the instruction delivered by the processor, and the processor is configured to run the instruction stored in the storage medium to control the communications interface, to implement the method according to any one of the implementations of the first aspect or the second aspect.

The ninth aspect describes an apparatus corresponding to the first aspect or the second aspect. For various specific implementations, descriptions, and technical effects of the ninth aspect, refer to the descriptions in the first aspect and the second aspect. Details are not described herein again.

According to a tenth aspect, an embodiment of this application describes a transmission control device, where the device includes a processing circuit, a communications interface, and a storage medium, where the storage medium stores an instruction, the communications interface is configured to perform information exchange with another device based on the instruction delivered by the processor, and the processor is configured to run the instruction stored in the storage medium to control the communications interface, to implement the method according to any one of the implementations of the third aspect or the fourth aspect.

The tenth aspect describes an apparatus corresponding to the third aspect or the fourth aspect. For various specific implementations, descriptions, and technical effects of the tenth aspect, refer to the descriptions in the third aspect and the fourth aspect. Details are not described herein again.

According to an eleventh aspect, a computer program product is provided, where the computer program product stores program code used to implement any one of the methods in the implementations of the first to the fourth aspects.

According to a twelfth aspect, a computer-readable storage medium including an instruction is provided, and when the instruction is run on a computer, the computer is enabled to execute program code used to implement the method in any one of the implementations of the first to the fourth aspects.

BRIEF DESCRIPTION OF DRAWINGS

To describe the technical solutions in some embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

Figure 1:
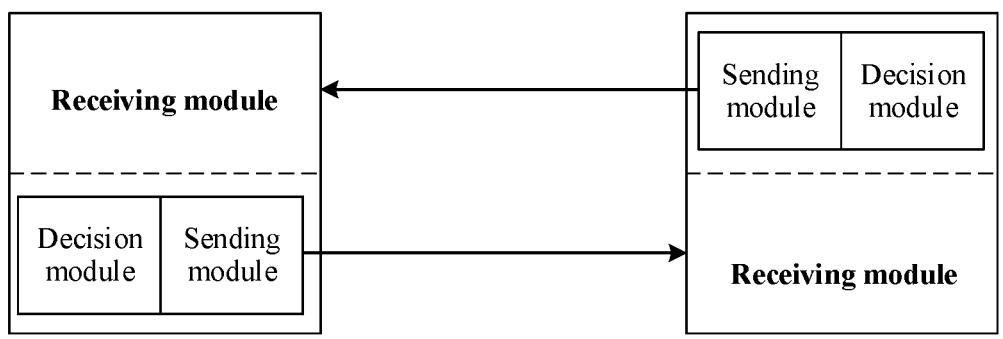
FIG. 1 is a schematic diagram of a system in which a data transmit end controls transmission.
Figure 2:
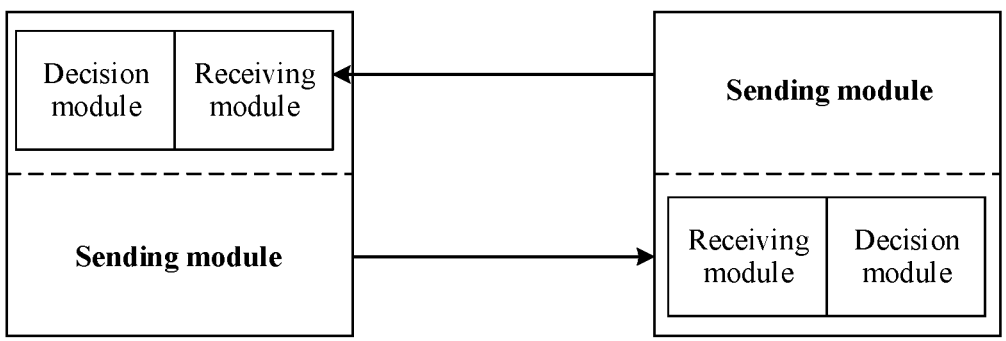
FIG. 2 is a schematic diagram of a system in which a data receive end controls transmission.

Embodiments of the present disclosure provide a transmission control method, apparatus, and system. The following clearly and completely describes the technical solutions in the embodiments of the present disclosure with reference to the accompanying drawings in the embodiments of the present disclosure. All other embodiments obtained by a person of ordinary skill in the art based on the embodiments of the present disclosure without creative efforts shall fall within the protection scope of the present disclosure.

The dual-end control mentioned above is very common in an actual scenario. For example, currently, people use a terminal device such as a mobile phone to connect to the Internet to obtain information or a service. This is typical communication between a cloud-side device and an end-side device. Terminal products are developing rapidly, and hardware and an operating system of the terminal product can support a plurality of applications. Software of the end-side device is usually updated through an online upgrade, or by downloading an update package, or the like. This flexible update manner can closely follow a change of a service requirement and ensure network transmission quality of a new service, so that the terminal product can support more complex services of more types. A service provided by an application or a web page on a terminal usually depends on data exchange with a cloud (for example, a server or a cloud platform). Different from a terminal market that changes quickly, a cloud side device as another participant of transmission is limited much on an update frequency, an update speed, and even an update permission due to characteristics such as a large quantity of services and complexity of a service. A cloud-side device serves as a service content provider, and this limitation severely restricts improvement of transmission quality of the mobile internet.

Therefore, this application provides a transmission control method and apparatus.

According to the method, a device at one end can control packet transmission. By using control signaling sent by a device at one end, a device at the other end does not need to make a decision, and only needs to transmit a packet based on a parameter carried in the control signaling and feed back a packet reception status, different from the prior art in which packet transmission is controlled by a data transmit end or a data receive end. In this way, steps in a transmission control algorithm can be implemented through control by one end. Devices at two ends do not need to be involved in upgrading or switching of the transmission control algorithm, and therefore an upgrade can be completed more conveniently and efficiently. In this application, a controlled packet is mainly a data packet, namely, a data package, and may further include some feedback packets. In this way, a device that controls packet transmission may be specified, or a controller may be determined through negotiation of devices at two ends in a connection. In this case, a device at the other end does not need to make a decision, and can send a packet merely based on a control signaling of the controller. The method described in this application is applicable to various communications scenarios, for example, communication between terminal devices, communication between cloud devices, and communication between a terminal device and a cloud device (referred to as end-cloud communication for short).

It should be noted that A and/or B in this application: indicates A and B, or A or B.

The following describes some terms used in this application.

A connection is used for data transmission between a transmit end (sender) and a receive end (receiver). One connection may correspond to a plurality of paths in a network topology, and a plurality of flows may be transmitted on one connection. The path is a link between a transmit end (sender) and a receive end (receiver). The plurality of flows may belong to one application, or may belong to different applications. The path may be identified by using a four-tuple or a 5-tuple. For example, the 5-tuple includes a source IP address, a source port number, a destination IP address, a destination port number, and a transport layer protocol name.

Transmission: bidirectional information exchange, that is, both sending and receiving are included.

Acknowledgement (ACK): also referred to as an acknowledgement packet, or an ACK packet. In this application, an ACK is used by a receiver to feed back one or more received data packets to a sender. Correspondingly, there is a NACK (namely, Non-Acknowledgement), and a NACK is used by a receiver to feed back one or more data packets that are not received to a sender.

A congestion window (CWND) is a maximum quantity of data packets that can be sent at a time by a source end of data in a case of congestion control in TCP data transmission. It should be understood that congestion window may be abbreviated as cwnd or CWND.

A send window, also referred to as a window, is used to indicate a quantity of bytes that a data transmit end is allowed to transmit, and is also a maximum data volume that a data receive end allows the data transmit end to put into a transmit queue at a time.

Round-trip Time (RTT): round-trip time, representing a delay from a time at which a transmit end sends data to a time at which reception acknowledgement information (for example, an ACK or a NACK) that corresponds to the data and that is sent by a receive end is received.

Handshake packet: a packet used to establish a connection between a client and a station through a secure encrypted transmission protocol. A handshake packet occurs in a handshake phase of a connection. Secure encrypted transmission may be implemented by using a transport layer security TLS) protocol, a secure sockets layer (SSL) protocol, a datagram transport layer security (DTLS) protocol, or the like.

Flow: a group of packets transmitted on a connection. A plurality of flows may be transmitted on a connection, and packet headers of the group of packets carry a same flow identifier number. The group of packets may be used to implement a service. For example, a stream is used to transmit data of a group of pictures on a web page, or data of a small video on a video website.

Figure 3:
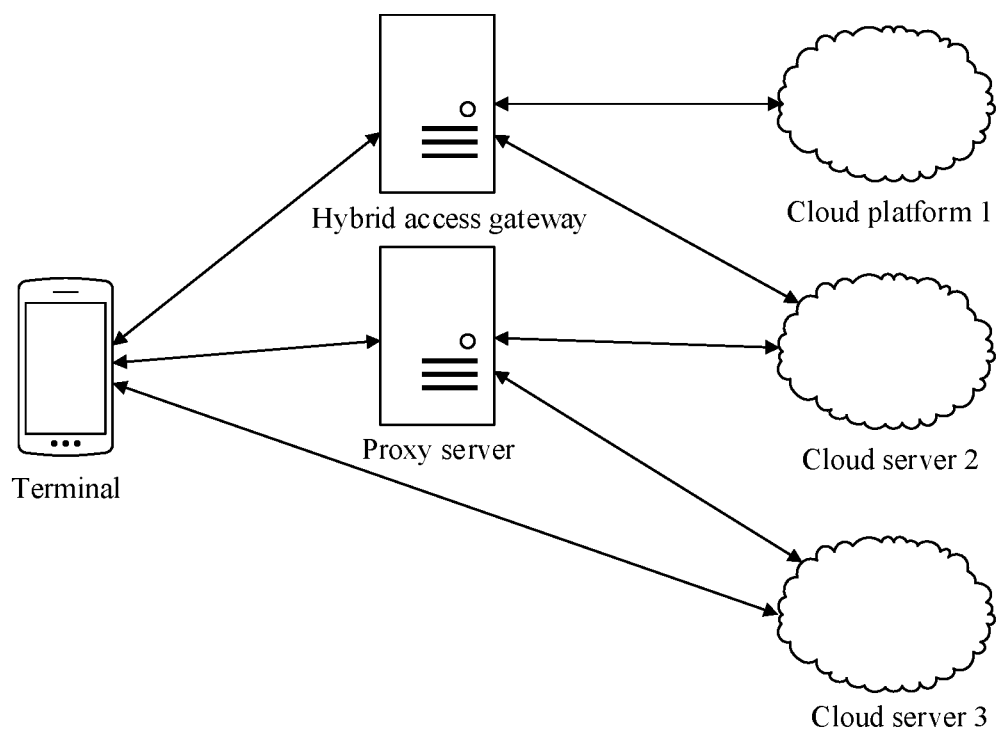
FIG. 3 is a schematic diagram of a networking system according to this application.

An end-cloud communications scenario is used as an example. FIG. 3 shows a common networking system in this application. In FIG. 3, a link between a terminal and a cloud device (for example, a cloud platform 1, a cloud server 2, and a cloud server 3 shown in the figure) may pass through a hybrid access gateway or a proxy server. A controller in a transmission control method described in this application may be a terminal. In this case, a controlled device is a cloud device (for example, the cloud server 3), a hybrid access gateway, or a proxy server. On the contrary, a controller is a cloud device (for example, the cloud server 3), a hybrid access gateway or a proxy server, and a controlled device is a terminal that accesses these devices. For example, if a terminal device is a controller, communication between the terminal device and a cloud may be always controlled by the terminal. In this case, only the terminal device needs to be upgraded, which is certainly more easily implemented. Alternatively, a cloud device is used as a controller, and in a process of communication between all terminal devices and the cloud device, packet transmission is always controlled by the cloud device. Therefore, if a transmission control algorithm needs to be upgraded or adjusted, only the cloud device needs to be adjusted to improve transmission performance, and this is certainly also quite convenient for a cloud service provider or a network service provider.

Figure 4:
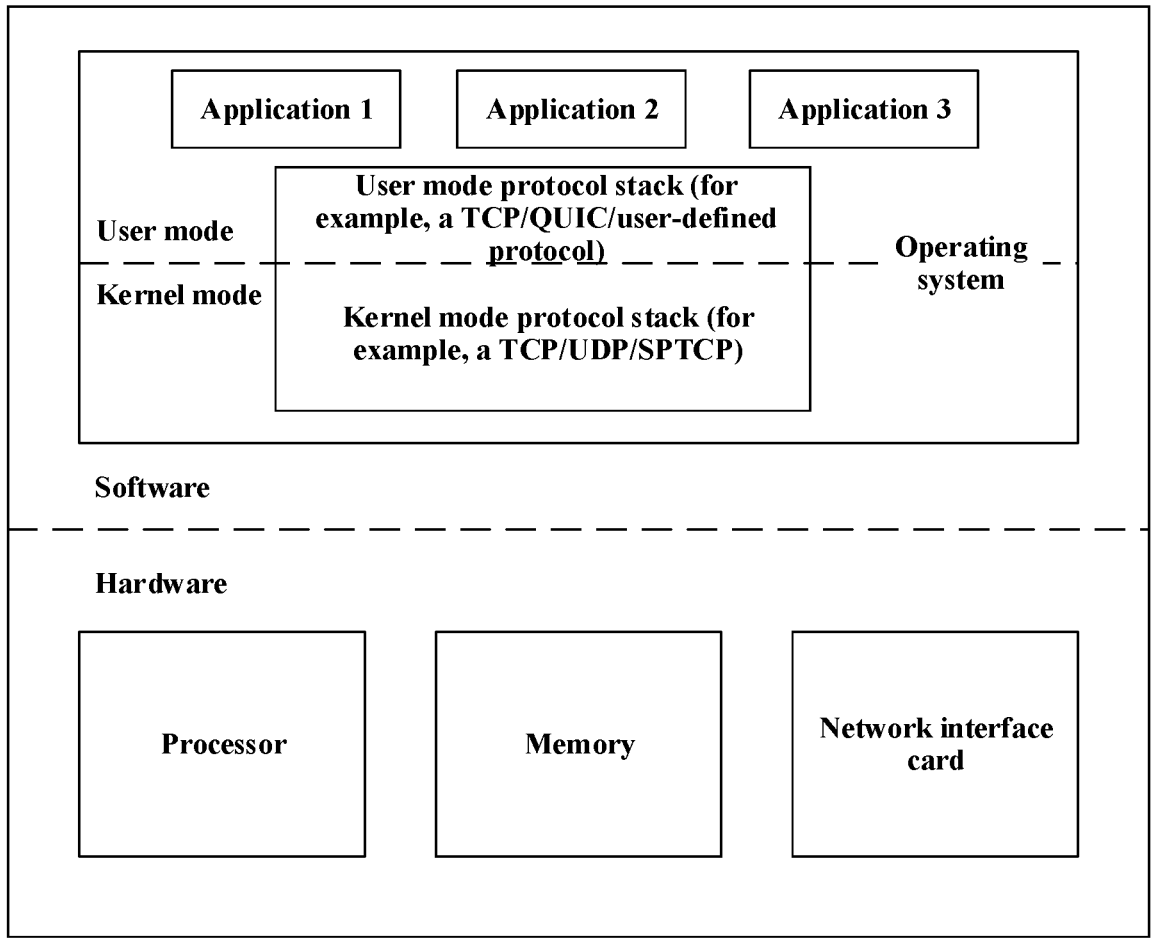
FIG. 4 is a structural diagram of a device according to this application.

A device in this application may be a cloud device or a terminal device. Various cloud platforms may be run on the cloud device, and a client of an application may be run on the terminal device. Specifically, as shown in FIG. 4, hardware of the device includes various hardware components or apparatuses, such as a memory, a processor, and a network interface card used for network interconnection. Software of the device includes an operating system and an application (for example, an application 1, an application 2, and an application 3) running in user mode of the operating system. The operating system may be divided into kernel mode and user mode. With a multi-layer structure, a protocol stack is distributed in both the kernel mode and the user mode. However, locations of different protocol stacks that can be arranged in the device are also slightly different. For example, a UDP, a stream control transmission protocol (STCP), or the like is a kernel mode protocol, a QUIC protocol and some private protocols belong to a user mode protocol, and a TCP protocol may be a kernel mode protocol or a user mode protocol. A device is usually configured with a plurality of transmission protocols. A type of a protocol supported by the device is not limited in this application.

The transmission method described in this application proposes a new transmission protocol. The new transmission protocol is implemented by modifying an existing protocol or defining a proprietary protocol. A software structure corresponding to a device may be an improvement on an existing protocol stack, for example, a TCP protocol stack, a UDP protocol stack, or a QUIC protocol stack in the user mode or the kernel mode, or a new proprietary protocol stack is added to the user mode, to generate a control packet or a frame that has a unified format and that carries control signaling, so as to control a peer device, where a format of the control packet or a format of the frame may be different from a format of a data packet. The control signaling may be carried in a plurality of manners. For example, based on an extension packet header in the existing protocol, a frame independent of a packet is used (for example, this form is used to improve the QUIC protocol), the control signaling is used as a payload of a QUIC packet or a UDP packet), or the control signaling is defined in options of the TCP protocol, and so on. To avoid excessive sending of control packets or frames, one control packet or frame may carry a plurality of pieces of control signaling, and a specific implementation is not limited in this application. For example, in an implementation, one control packet includes a plurality of frames, and each frame includes one piece of control signaling. Because each frame may carry one flow ID, and one flow ID represents one flow transmitted on the connection, one control packet may carry control signaling used to control packet transmission of different flows. In another implementation, one frame carries a plurality of pieces of control signaling. In this way, a quantity of frame headers may be reduced, and control signaling of a flow corresponding to specific load of a frame may be predefined.

In this application, descriptions are provided from a perspective that a local device is a controller. Transmission control includes at least two aspects: sending control, that is, the local device controls how a peer device sends a packet that carries data; reception control, that is, after sending data to the peer device, the local device controls how the peer device feeds back a reception result of the data. It should be understood that the result that is fed back in this application may use a format newly defined below. Alternatively, reference may be made to a format of a feedback packet such as an ACK or a NACK in the existing TCP protocol. Control signaling used to implement that the two types of control carries different types of parameters. A device that is the controller can implement various transmission control algorithms by constantly sending the control signaling and adjusting a value of a parameter carried in the control signaling. For example, the local device adjusts the parameter based on a connected network status, to switch a transmission control algorithm or implement different phases of a transmission control algorithm. The network status may be represented by at least one of these parameters: bandwidth, a delay (a transmission delay or a round-trip time), delay variation, jitter, a packet loss rate, signal strength of an accessed network, and the like.

In this way, in a transmission process, the local device may perform adjustment in real time to switch a transmission control algorithm. To be specific, a parameter is adjusted, to provide better network service quality for different applications in different scenarios.

In addition, the local device maintains a plurality of control signaling sets used to implement different transmission control algorithms, and one or more of the different transmission control algorithms may be set to a default transmission control algorithm. Certainly, a control signaling set may alternatively be added, so that the local device supports more transmission control algorithms. Transmission control of the local device may also be implemented by using the foregoing control signaling, and the control signaling is transferred by using a defined interface function. In this way, various transmission control algorithms may use the following several types of control signaling as a basic morpheme and are expressed by changing a parameter, sequential repetition of a parameter, and combination of parameters. For example, the following several types of control signaling may be considered as 26 English letters, and various words may be produced to form various sentences through combination, where these words and sentences are diversified transmission control algorithms. Therefore, when the control signaling described in this application is used, a network parameter specified in an existing protocol, for example, a parameter such as bandwidth, a packet loss rate, or a round-trip time, may still be used to describe transmission performance of a connection. Therefore, a transmission control algorithm can be adjusted provided that a sending order of the control signaling and a rule of carrying the parameter are modified, without replacing algorithm logic as a whole. This makes processing by the device simpler and more convenient, reduces a workload of upgrading or adjusting the transmission control algorithm, and improves upgrade efficiency.

Figure 5:
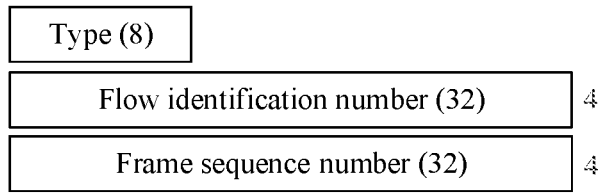
FIG. 5 is a schematic diagram of a frame header according to this application.

The control signaling may be encapsulated in a control packet or a control frame. For example, the control signaling is encapsulated as a frame and is used as load of a UDP packet. A non-data packet (for example, control signaling and a response thereof) and data may be transmitted in different flows. Different flows are identified by different IDs, which are referred to as flow identification numbers or flow IDs. In other words, one connection is reused by a plurality of flows, that is, a control flow and a data flow are separated, and the data flow and the control flow may use different transport protocols. In an implementation, the data flow and the control flow belong to a same application, and only data of the application is transmitted in one data flow and a control flow corresponding to the data flow. In an implementation, control signaling of a plurality of applications is transmitted in a same control flow. In this way, a sequence number may be allocated to a control frame or a control packet separately, to better preserve an order in transmission. For example, sequence numbers of the control frame are represented by a progressively increasing sequence with a common difference of 1. In an implementation, each control frame may include a type parameter, to represent a type of control signaling carried in the control frame, and this helps a device that receives the control signaling identify the type, that is, control signaling of a same type is encapsulated in a control frame. The parameter may be carried in a frame header, and the control signaling is also carried in a part after the frame header. The frame header may be in a general format, including a type and a frame sequence number. In another implementation, the frame header further includes a flow identifier field, which is used to carry the flow identification number described above. For example, in a frame header structure shown in FIG. 5, a length of a type field is 8 bits (1 byte), a length of a flow identifier field is 32 bits (4 bytes), and a length of a frame sequence number field is 32 bits (4 bytes). Therefore, control signaling that controls different flows and that is of a data packet may be encapsulated in different frames. The type field may define a value by itself. For example, it is defined that a type field of a sending control frame is 0x01, a type field of a peer information request frame is 0x02, a type field of a peer information response (acknowledgement) frame is 0x03, a type field of a reception control frame is 0x04, and various frames carry signaling of a corresponding type.

For a connection, devices at two ends may determine, in a link establishment phase of the connection or even before link establishment, one device to be the controller. A determining process of the link establishment phase is described below. Certainly, a device may also be specified, or it is specified by default that a device at one end is the controller. The following describes, by using an example in which a first device and a second device transmit data through a connection and the first device is the controller, that the first device controls signaling used in a process of transmitting data by the peer device, namely, the second device. For example, in an end-cloud communications scenario, the first device is a terminal, and the second device is a cloud server, a cloud proxy server, a load balancer, or a hybrid access gateway.

In the first scenario, the first device is a data receive end, corresponding to the sending control mentioned above.

Sending control involves the following types of signaling.

Sending control signaling instructs, by using a sending control parameter included in the sending control signaling, a peer device to send, based on the sending control signaling, packets that should be sent at a time interval at which these packets should be sent. The included sending control parameters may be combined in a plurality of manners.

Specifically, the sending control parameters may be: an initial packet sequence number, a packet sequence number range, and a transmission time interval. The initial packet sequence number is a packet sequence number (SN), and is used to indicate a first packet, for example, a packet with a smallest packet sequence number, in a plurality of packets that are controlled to be sent by using one piece of control signaling.

The sending control signaling instructs the peer device to send packets that start from the initial packet sequence number within the packet sequence number range, and send the packets at the transmission time interval. A value of the initial packet sequence number is a sequence number of a packet. It should be understood that the packet sequence number may identify a packet, or may identify a sequence of a packet. For example, a packet with a smaller packet sequence number should be processed first (for example, being sent or received). For a known protocol, a naming rule of the packet sequence number is determined, and this application can made reference to the rule. For a proprietary protocol, a naming rule of the packet sequence number also needs to be specified. Therefore, a packet that needs to be sent may be represented by using the initial packet sequence number and the packet sequence number range. The transmission time interval is a time-related parameter, and may be indicated by using bandwidth, or may be directly indicated by using a time interval. This is because for a determined protocol, a length of each packet is known, that is, a payload of the packet is known, and the bandwidth represents a data volume sent per unit of time. Therefore, there is a definite mathematical relationship between the bandwidth and a time interval at which an action of sending a packet is performed. For example, an initial packet sequence number carried in a piece of sending control signaling is 12, a packet sequence number range is 10, a transmission time interval is represented by bandwidth, and a value of the bandwidth is 1 mbps. If in a protocol of the connection, packet sequence numbers of data packets are numbered into an arithmetic sequence with a common difference of 1, in this case, the sending control signaling instructs to send 10 packets whose sequence numbers are from 12 to 21 at a time interval of 1/(1 mbps), namely, a reciprocal of the value of bandwidth.

Figure 6:
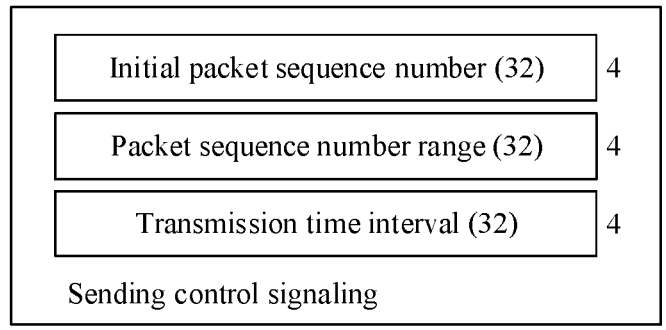
FIG. 6 is a schematic diagram of sending control signaling according to this application.

In an implementation, as shown in FIG. 6, in sending control signaling, a length of a packet sequence number (namely, an initial packet sequence number) field is 32 bits (4 bytes), a length of a packet sequence number range field is 32 bits (4 bytes), and a length of a transmission time interval field is 32 bits (4 bytes). For example, an arrangement order of the three fields may be shown in FIG. 6. The sending control frame may include one or more pieces of sending control signaling. When a plurality of pieces of sending control signaling is included, one field should be included in the sending control frame to indicate a quantity of pieces of control signaling in the frame.

In an implementation, the first device receives a data packet whose packet sequence number is A, to trigger sending of new sending control signaling. A value of a parameter in the new sending control signaling is related to a transmission control algorithm applied between the first device and the second device. For example, an initial packet sequence number in the new sending control signaling is A+1.

By using the foregoing signaling, sending of a data packet of a peer device can be controlled. Only a parameter in the sending control signaling needs to be changed for determining a manner of sending data by the peer device.

For some algorithms, control signaling: peer information request signaling and a response to the control signaling, namely, a peer information response (acknowledgement) further need to be used for control.

The peer information request signaling is used to instruct the peer device to send a response to the peer information request signaling, that is, instruct the peer device to feed back a sending status of a plurality of data packets that start from the packet sequence number. The peer information request signaling includes a packet sequence number, and the packet sequence number is an initial packet sequence number of the peer information request signaling. In this way, a local device may learn, based on the response, a remaining length of a transmit queue of the peer device, that is, learn a quantity of to-be-sent packets or data volumes in the transmit queue of the peer device. Based on this, the local device determines whether a flow transmitted on the connection or traffic of an application served by the connection is restricted, and may also determine whether a value of bandwidth currently estimated by the local device is consistent with actual network bandwidth or bandwidth when the application is restricted. Therefore, generally, one piece of peer information request signaling and one piece of sending control signaling may carry a same initial packet sequence number. According to a time sequence, one piece of peer information request signaling is sent after at least one piece of control signaling is sent. A condition for triggering sending of the peer information request signaling is not limited in this application. For example, a condition for sending the peer information request signaling may be set as the following: periodically sending, sending when a change of an estimated network parameter, for example, bandwidth, a round-trip time, or a transmission delay meets a condition, sending after several pieces of sending control signaling is sent, sending each time several data packets are received, or the like.

The peer information response (acknowledgement) is a response to the foregoing peer information request signaling. After receiving a piece of peer information request signaling, the peer device sends a response to the peer information request signaling. When a data packet and a control packet are sent by using different flows, the peer information response (acknowledgement) is sent in a control flow.

The peer information response (acknowledgement) includes a packet sequence number (namely, an initial packet sequence number of the peer information response (acknowledgement)) and information about a to-be-sent data packet. The information about the to-be-sent data packet is used to indicate information about at least one to-be-sent data packet that starts from the initial packet sequence number of the peer information response (acknowledgement). The information about the at least one to-be-sent data packet may be information about all or some data packets to be sent by the peer device. For example, the information about the at least one to-be-sent data packet may be a quantity or packet sequence numbers of all or some to-be-sent data packets. The all or some to-be-sent data packets may be all or some data packets that are not sent in the transmit queue of the second device in this case, or may be all packets that are not sent by the second device in this service (for example, transmitting an image or refreshing a web page). A piece of peer information request signaling and a corresponding peer information response (acknowledgement) include a same initial packet sequence number.

Figure 7:
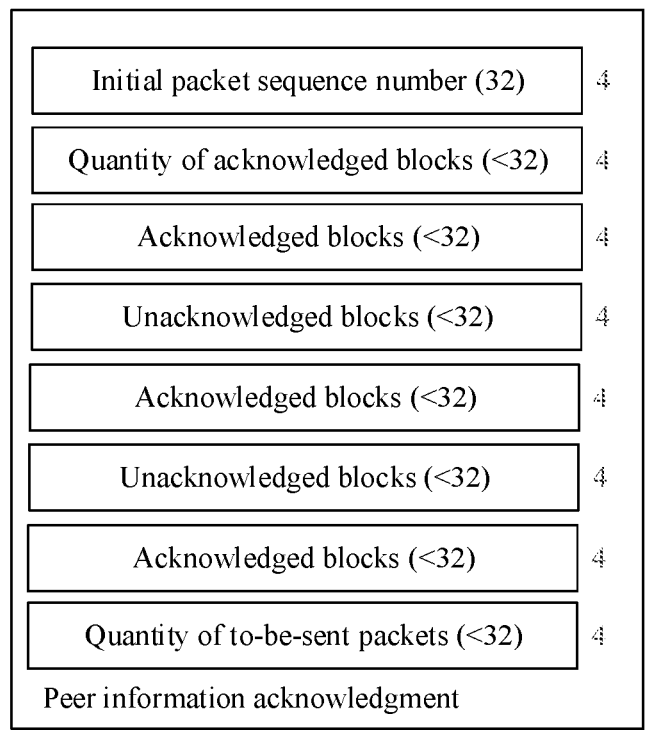
FIG. 7 is a schematic diagram of a response to peer information request signaling according to this application.

The peer information response (acknowledgement) may further include information about a sent packet. The information about the sent packet includes information about a plurality of packets (or data blocks) that start from the initial packet sequence number and that have been sent by the peer device, where it is determined that the packets have been successfully received. For example, the information about the sent packet may be a packet sequence number, an offset of a quantity of packet sequence numbers, an offset of data, a bitmap, or the like. In some implementations, information about a packet (or a data block) that has been sent may be further included, where it is not determined that the packet is received by the local device (for example, the first device). The information about the packet that is not sent may be a packet sequence number, an offset of a packet sequence number, an offset of data, a bitmap, or the like. Specifically, it is defined that a number in some bytes of a peer information response (acknowledgement) represents information about a sent packet, and a number in some other bytes represents information about a packet that is not sent. A format of the peer information response (acknowledgement) is not limited in this application. For example, as shown in FIG. 7, in a peer information response (acknowledgement), a length of an initial packet sequence number field is 32 bits (4 bytes), and several variable-length fields (7 fields in FIG. 7) are sequentially included. A maximum length of each variable-length field is 32 bits (4 bytes), and the variable-length field includes an acknowledgement block quantity field, used to indicate a quantity of data blocks that are carried in the signaling, where it is determined that the data blocks are sent. An acknowledgement block field and an unacknowledged block field are set at an interval. Each field indicates sending information of a data block, and may be represented by an identifier of the data block or a length of the data block. In this way, it may indicate that, it is determined that data of several fields that start from the initial packet sequence number has been sent, and it is not determined that data of several following fields is not sent. In addition, a field of a variable length further includes a field of a quantity of to-be-sent packets, used to indicate a quantity of packets that are not sent.

In this way, sending control of the peer device can be implemented through combination of use of the foregoing a plurality of pieces of control signaling, and a plurality of existing transmission control algorithms can also be performed. By using the control signaling sent by the first device, a device at the other end does not need to make a decision, and only needs to send a packet based on a parameter carried in the control signaling. Further, a transmission control algorithm may be implemented by modifying the parameter in the control signaling sent by the device at the one end and a sending order of the control signaling, and the transmission control algorithm may be upgraded and modified. Therefore, it is more convenient to implement, modify, and upgrade the transmission control algorithm. For details, reference may be made to the following example.

In the second scenario, the first device is a data transmit end, corresponding to the reception control mentioned above. The reception control is implemented by sending reception control signaling.

The reception control signaling controls, by using a reception control parameter in the reception control signaling, the data receive end to feed back a receiving status of the data packet. For example, the reception control signaling may notify the data receive end of a condition for feedback (which may also be understood as a feedback occasion) and a range of a data packet that needs to be fed back. In this way, the data transmit end may determine, based on these feedback, whether these data packets are correctly received. The included receiving control signaling may be combined in a plurality of manners. In a multi-flow multiplexing scenario, the data receive end sends a feedback packet based on the reception control signaling by using a control flow. A format of the feedback packet is not limited in this application. For example, the feedback packet may be an ACK or a NACK in the prior art. In the prior art, such control is implemented by a data receive end, and therefore, reception control signaling does not need to be sent.

Figure 8:
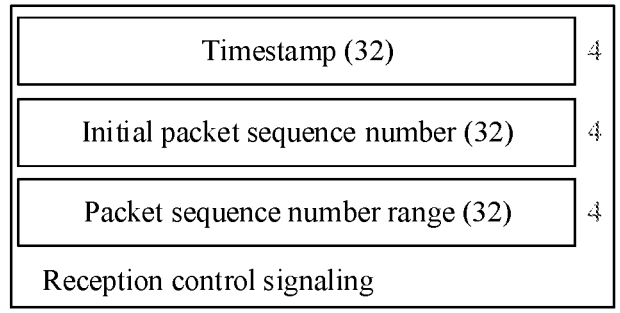
FIG. 8 is a schematic diagram of reception control signaling according to this application.

In an implementation, the reception control signaling includes a packet sequence number (namely, an initial packet sequence number), a packet sequence number range, and a timestamp. The initial packet sequence number and the packet sequence number range are used to indicate that receiving statuses of some specific data packets need to be fed back. For specific explanations of the two parameters, refer to the foregoing paragraphs. The timestamp is a moment of sending the reception control signaling, and may be used to collect cases of a packet disorder, calculate a network delay, and the like. Receiving the reception control signaling is an event that triggers generation and sending of feedback, for example, triggering a process of sending feedback. The reception control signaling shown in FIG. 8 is used as an example, where a sequence and a respective length of three parameters are as follows: a timestamp with a field length of 32 bits (4 bytes), an initial packet sequence number with a field length of 32 bits (4 bytes), and a packet sequence number range with a field length of 32 bits (4 bytes). The three parameters is different from that of the sending control signaling, and a sequence of the three parameters is also different. In an implementation, the initial packet sequence number is set to a maximum value in packet sequence numbers of data packets when the reception control signaling is generated, where it is determined by the data transmit end that the data packets are received or processed. "Processed" means that the data transmit end has determined that a data packet is lost, and therefore modifies a packet sequence number of a copy of the data packet, to retransmit the lost data packet. The packet sequence number range is set to a maximum value of packet sequence numbers of data packets, sent by the data transmit end, when the reception control signaling is generated, and the timestamp is set to a moment of sending the control signaling.

After receiving the reception control signaling, the data receive end, for example, the second device feeds back a receiving status of data packets within a range from the initial packet sequence number to a packet sequence number that is not greater than a packet sequence number indicated by a packet sequence number range. For example, a receiving status may be: which data packets are received or which data packets are not received, and a timestamp of the reception control signaling that triggers the feedback should be further carried. In an implementation, a processing delay may be further included, and the processing delay is a time difference between a time of receiving the reception control signaling and a time of sending the feedback corresponding to the reception control signaling. In this way, the data transmit end can more accurately collect cases of a network propagation delay. If a value of a range of data packets that need to be fed back exceeds a supported maximum value for feeding back packets, not all data packets can be fed back, but only a receiving status of data packets of a quantity below the maximum value is fed back.

Figure 9:
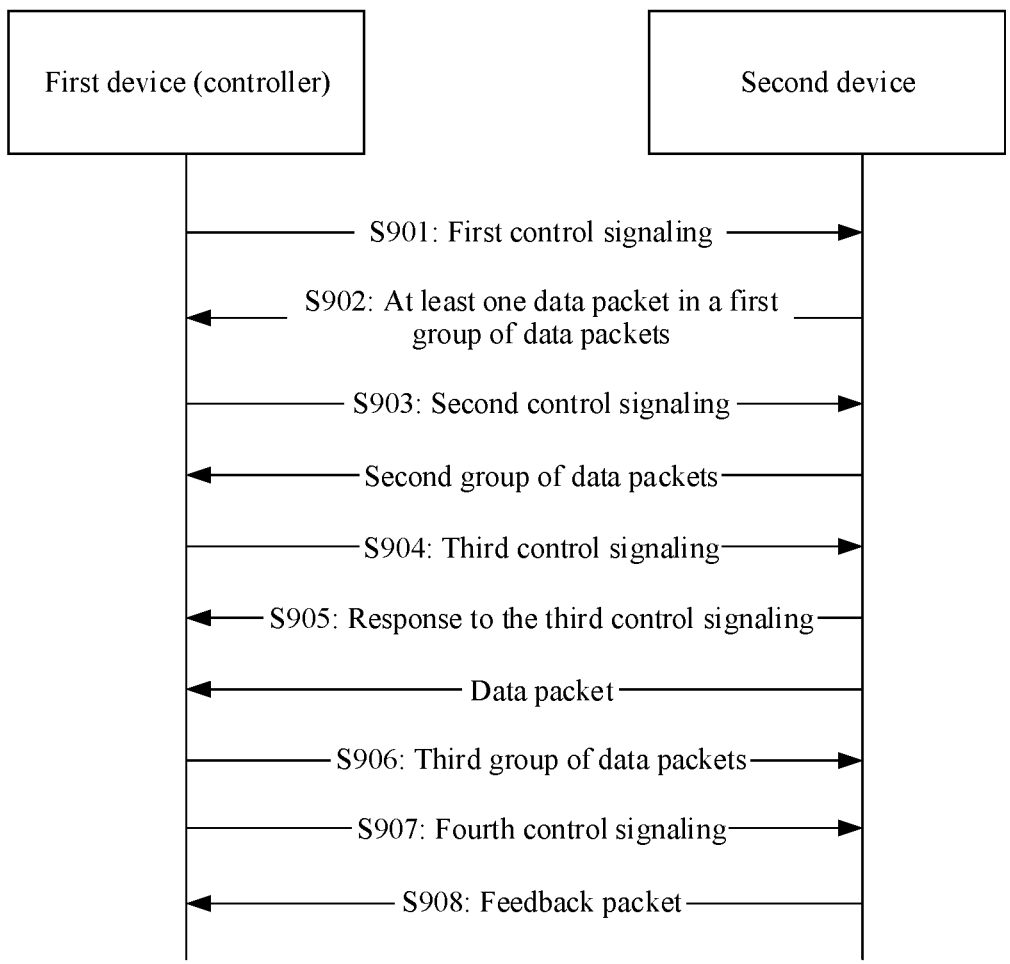
FIG. 9 is a flowchart of a transmission control method according to this application.

With reference to FIG. 9, the following describes a process in which a first device, as a controller, controls packet transmission between the first device and a second device by using the foregoing control signaling. In this process, the first device first receives a group of data packets sent by the second device (S901-905), and then the first device sends a group of data packets to the second device (S906-908). It should be understood that the following S901-908 is merely for ease of identification, and the steps are not necessarily performed in a sequence of numbers, but subject to literal explanation. In addition, because a connection between the first device and the second device supports multi-flow transmission, and S901-905 and S906-908 may be performed on different flows, the steps may be performed at the same time or execution times of the steps may overlap.

S901: The first device sends first control signaling to the second device, where the first control signaling instructs the second device to send a first group of data packets.

The first control signaling is the foregoing sending control signaling, and therefore includes a first packet sequence number, a first packet sequence number range, and a first transmission time interval. In this way, the first packet sequence number and the first packet sequence number range may indicate the first group of data packets. The first transmission time interval indicates a time interval for sending the first group of data packets. The time interval may be represented by bandwidth.

S902: The second device sends the first group of data packets based on an indicated packet sequence number and the first transmission time interval in the received first control signaling.

S903: The first device receives at least one data packet in the first group of data packets, and sends second control signaling based on a first data packet in the at least one received data packet. A packet sequence number of the first data packet is the largest in the at least one data packet.

The second control signaling includes a second packet sequence number, a range of the second packet sequence number, and a second transmission time interval. The second packet sequence number and the second packet sequence number range may be considered as indicating a second group of data packets. The second transmission time interval indicates a time interval for sending the second group of data packets.

The second packet sequence number is greater than the packet sequence number of the first data packet.

The data packet received by the first device may still trigger sending of the sending control signaling. In this way, the first device can continuously control the second device. In actual application, a next piece of sending control signaling may be sent after the first group of data packets are completely received. To be specific, the second packet sequence number and the range of the second packet sequence number may indicate a next packet after the first group of data packets. For example, the first group of data packets are packets numbered 1 to 10, and the second packet sequence number is 11. Subsequently, the second device continues to send a data packet based on the second control signaling.

In another implementation, after one or more data packets are received, next piece of sending control signaling may be sent. Because a transmit delay exists in a device, and a network delay exists in a network, this implementation can better control data sending at a peer end. To be specific, packets indicated by the second packet sequence number and the second packet sequence number range may overlap with the first group of data packets with respect to numbers. For example, the first group of data packets are packets numbered 1 to 10. After the packets numbered 1 to 4 are received, the second control signaling is sent, and therefore the second packet sequence number is 5.

It can be learned that next piece of sending control signaling may be sent in a process of receiving the first group of data packets.

S904: The first device sends third control signaling to the second device, where the third control signaling includes the first packet sequence number.

The third control signaling is the foregoing peer information request signaling.

The third control signaling is sent after the first control signaling, but may be sent before or after the second control signaling. A specific occasion depends on a condition for triggering the third control signaling in a transmission control algorithm. FIG. 9 describes a case that the third control signaling is sent after second control signaling.

S905: The first device receives a response to the third control signaling, where the response to the third control signaling includes the first packet sequence number and information about at least one to-be-sent data packet that starts from the first packet sequence number.

The response to the third control signaling corresponds to the foregoing peer information response (acknowledgement).

When the peer information response (acknowledgement) is received, not all of the first group of data packets and the second group of data packets are sent. Therefore, the first device may further continue to receive the data packet sent by the second device.

S906: The first device sends a third group of data packets to the second device.

The third group of data packets are a plurality of data packets that start from a third packet sequence number within a third packet sequence number range.

S907: The first device sends fourth control signaling to the second device, where the fourth control signaling includes the third packet sequence number, the third packet sequence number range, and a timestamp, and the timestamp is a system time of the first device when the fourth control signaling is sent.

The fourth control signaling is reception control signaling.

S908: The first device receives a response to the fourth control signaling, where the response to the fourth control signaling includes the timestamp, and the response to the fourth control signaling further includes information about a data packet that is received or not received, wherein the data packet is a data packet in the third group of data packets.

The response to the fourth control signaling is a feedback packet triggered by the fourth control signaling.

The following uses a bottleneck bandwidth (BBR) and a round trip time (RTT) algorithm proposed by Google as an example to describe how the first device implements the algorithm by using the foregoing signaling. Data is transmitted in the connection by using a new protocol in the foregoing user mode, and the packet and frame format may be used in the new protocol in the user mode to transmit the signaling.

First round of control: The first device sends the first piece of sending control signaling in the round to the second device, where an initial packet sequence number is 1, a packet sequence number range is 10, and a transmission time interval is represented by bandwidth and is 1 mbps. After receiving the first piece of control signaling, the second device sends data packets numbered 1 to 10 at the bandwidth of 1 mbps. After receiving the data packet numbered 1, the first device feeds back the second piece of sending control signaling, where an initial packet sequence number is 2, a packet sequence number range is 11, and bandwidth is 11/RTT mbps. The RTT is a round trip time of the connection.

In this process, the first piece of sending control signaling means sending 10 data packets in the first RTT, the value of 10 corresponds to a size of an initial send window of a data flow, and both the first piece of sending control signaling and link establishment signaling are sent in a handshake packet. In this way, if a link is successfully established, the control signaling is also successfully sent at the same time, so that the second device may immediately send data. This is true in an existing transmission protocol, that is, time validity is consistent with the existing protocol. It takes RTT/2 from a time of sending a data packet by the second device for the first time to a time of receiving the first data packet. Receiving of the first data packet triggers the first device to send the second piece of sending control signaling, and the second piece of sending control signaling reaches the second device after the RTT/2. In this case, the second device completes the first round (which is simply understood as an RTT) transmission, and receives new control signaling (namely, the second piece of sending control signaling). BBR implemented in the existing protocol is as follows: the second device sends 10 data packets in the first round, waits for a first ACK to arrive, updates a size of a congestion window to 11, and sends another data packet by sliding the window right. Therefore, the second piece of sending control signaling is equivalent to arrival of the first ACK packet in the BBR. It indicates that a loss or disorder of a feedback packet (which reflects as a jitter with a variable value in terms of a delay) and a packet loss of a data packet have a same impact on an existing implementation and an implementation in which the control signaling described in this application is used.

Second round of control: A control process in the second round may be concluded as follows: after the first piece of sending control signaling (in which an initial packet sequence number of the first piece of sending control signaling should be 11, and a packet sequence number range is 10) in the second round is sent, each time a data packet is received, a next piece of sending control signaling is correspondingly generated, where the initial packet sequence number is increased by 1, the packet sequence number range is increased by 1, and the transmission time interval is set to a value after the packet sequence number range is divided by the RTT. This change rule lasts until the last data packet (for example, a data packet numbered 20) indicated by the first piece of sending control signaling in the current round is received, and sending control signaling triggered by a data packet numbered 20 is sent. From this, a new round of control begins, and the change rule is adjusted as: the packet sequence number range is doubled on a basis of the previous sending control signaling. In this way, a data volume that is approximately twice as large as that in the previous round may be sent. A mechanism of this control process is consistent with that of a congestion control slow start phase in the BBR. Reference may be made to other documents that describe the BBR for understanding.

In other words, one round of control is a process from sending the first piece of sending control signaling to receiving all packets that are sent under an instruction of the first piece of sending control signaling. In an implementation, a quantity of packets sent in one round of control is a quantity of packets corresponding to a value of the send window when the first piece of sending control signaling is sent in the round of control.

Bandwidth estimation: when the first device finds that an increment of a value (a successfully sent data volume/RTT) in three consecutive rounds of control is less than 25%, the first device determines that network bandwidth of the connection is the largest. A bandwidth detection and estimation phase is entered. In this phase, the bandwidth detection is performed with a period of eight rounds, a value of a packet sequence number range in the first round of one period is 1.25 times a bandwidth-delay product (BDP), and a value of a packet sequence number range in the second round of one period is 0.75 times the BDP. Then, a packet sequence number range in six rounds is the BDP, and the first device does not perform active adjustment.

Specifically, after it is detected that the bandwidth is the largest, the first round of sending control of a bandwidth detection period is entered. Each time one data packet is received, an initial packet sequence number of a next piece of generated sending control signaling is increased by 1. Each time four data packets are received, a packet sequence number range is increased by 1, until a data packet with a largest packet sequence number that is sent under an instruction of the first piece of sending control signaling in the current round is received, that is, the last data packet in the current round of control is received. Subsequently, the second round of the bandwidth detection period starts. Each time a new data packet is received, an initial packet sequence number of a next piece of generated sending control signaling is increased by 1. Each time four data packets are received, a packet sequence number range is increased by 1 until the last data packet in the current round of control is received. Subsequently, the last six rounds of the bandwidth detection period start, and in the last six rounds, a packet sequence number range remains unchanged.

In the foregoing control process, a method for updating bandwidth estimation is: in one round of sending control, each time a data packet is received, a bandwidth value of the round of sending control to which the data packet belongs is calculated, and first three values of the calculated bandwidth value in the round of sending control are reserved, where the bandwidth value estimated in this round is a maximum value in the first three values. When a new round of sending control, namely, a new round of bandwidth estimation period starts, the three values in the previous round are gradually replaced by calculated bandwidth values in the new round, and finally, after the new round of sending control ends, a maximum value in three updated values is used as estimated bandwidth in the new round.

Further, a transmission control algorithm may also be changed during data transmission by using the foregoing signaling. The following describes, by using an example, a process of switching to another algorithm by using the foregoing signaling based on an embodiment of describing a BBR algorithm. A condition for switching to another algorithm may be: in the bandwidth detection and estimation phase, among all detected bandwidth statistics values, a maximum value is more than 20% larger than a second largest value. This condition indicates that a network is unstable. The another algorithm may be a window-based congestion control algorithm. According to the algorithm, a parameter in sending control signaling is adjusted in the following manner: (1) A packet sequence number range in a new round of control is increased by 1 each time a data packet in a packet sequence number range in a previous round is successfully transmitted; (2) A transmission time interval is represented by bandwidth, and a value is a maximum value that can be represented by a field used to represent the parameter in the sending control signaling; (3) When the first device detects a packet loss, a value of the packet sequence number range is halved. Each time one piece of sending control signaling is received, a data transmit end sends, by using a maximum sending rate supported by the data transmit end, data (namely, an initial packet sequence number carried in the sending control signaling and a packet indicated by a packet sequence number range) indicated by the sending control signaling.

It can be learned that the parameter carried in the control signaling changes over time, so that different types of congestion control algorithms can be described. Further, different types of congestion control algorithms can be implemented provided that the parameter carried in the control signaling is changed. Therefore, transmission control in the existing protocol and an algorithm can be implemented by using the method and the control signaling described in this application.

In addition, in some scenarios, some fields may be further added to a data packet, to implement control. For example, a connection between the first device and the second device corresponds to a plurality of links, that is, a multipath transmission mode is used. A low-delay scenario is used as an example to describe how to control a sending path of a peer device, to implement three transmission modes. The three transmission modes are as follows: redundant transmission by only using a network 1, redundant transmission by only using a network 2, and redundant transmission by using the network 1 and the network 2. For example, the network 1 is a Wi-Fi network, and the network 2 is a cellular wireless network such as a LTE network. Certainly, Multipath Transmission Control Protocol (MPTCP) transmission has another transmission mode. For example, the network 1 and the network 2 are used for aggregated transmission. Another combination of transmission modes in an MPTCP protocol may also be controlled in a similar manner. For a specific implementation, reference may be made to the following description. The control may be implemented in the first device or the second device.

Specifically, the data packet may include a dual-path identifier, used to indicate a path used by the peer device to send a packet. The dual-path identifier may be a dual-path flag. In this way, a transmission mode may be represented by using a value of the dual-path flag or information indicating whether there is a flag. For example, the control is implemented in the first device. When the dual-path identifier indicates that a transmission mode is single-path transmission, the first device receives, on a path used for sending a first packet, a packet sent by the second device. When the dual-path identifier indicates that a transmission mode is multipath transmission, the first device receives, on each of the plurality of paths, a packet sent by the second device. In an implementation, (1) if the dual-path flag is set to 0, it indicates that a controller is in a transmission mode in which only the LTE network or the Wi-Fi network is used, and then the second device sends a packet on a path on which a packet is received; (2) if the flag is set to 1, it indicates that the controller is in a redundant transmission mode, and the second device redundantly sends data by using two paths. The dual-path flag may be added to an extended UDP or TCP packet header for implementation, or a user-defined protocol header may be added after a UDP or TCP packet header for implementation of the dual-path flag.

The foregoing method may also be implemented by directly extending the UDP, TCP, or MPTCP protocol, or by modifying a user mode protocol above the UDP/TCP. In this way, packet transmission control on a single transmission path in the MPTCP scenario can be supported by using the control signaling described above at the same time.

From a perspective of a software architecture, an idea of the solutions described in this application is to extract a transceiver function for data transmission and some basic functions used to support the transceiver function. Modules that perform these functions may be collectively referred to as basic function modules, and these modules may be code or functions, and are executed by a process or a thread. A basic function used to support a transceiver function may be data encryption and decryption (for example, a transport layer security, Transport Layer Security, TLS) used to ensure data security, encoding and decoding (for example, forward error correction, Forward Error Correction, FEC) used to improve transmission efficiency, cache management, connection management, path management, flow management, or the like. These functions are still symmetrically implemented on devices at two ends that exchange information as in the prior art. These function modules are for a basic architecture of a transmission protocol and have to be deployed symmetrically. In addition, a change to the modules has great impact, and therefore an upgrade period is long. This matches a characteristic of a long period for a cross-department upgrade. In other words, symmetric deployment of these functions does not bring a significant upgrade efficiency problem.

In another aspect, a control function is separated from a conventional protocol stack. The control function is control over the foregoing transceiver function and a supporting function of the transceiver function. The control includes but is not limited to an operated object, a behavior manner, a trigger occasion, and the like of the foregoing basic function. The operated object may be in a format of bearer information such as a packet or a frame, or may be an implementation of the basic function used to support the transceiver function. The behavior manner includes but is not limited to at least one of an interval, an order, and a path for sending a packet or a frame, or a processing action performed on the packet or the frame, for example, clear cache or retransmission after a packet or a frame is received.

Apparently, this architecture also supports transmission control on a local device. By invoking a function in an improved protocol stack, for example, a defined internal interface, control signaling is transferred from a local control module to a transceiver module.

Specifically, the control module that performs the control function may output control information for the local device based on network information from the local device. The control information may include the operated object, the behavior manner, the trigger occasion, and the like. The network information of the local end may be obtained from a basic function module of the local end by using the internal interface function. The network information includes a parameter, for example, bandwidth, a delay, or a congestion window, that represents a status of a network of the local device, and may further include a transmission parameter of the local device mentioned below. The control information is transferred to the basic function module of the local end by using the internal interface function. The basic function module of the local end performs, based on an instruction of the control information, a basic function such as packet sending, to implement transmission control performed on the local device.

Figure 10:
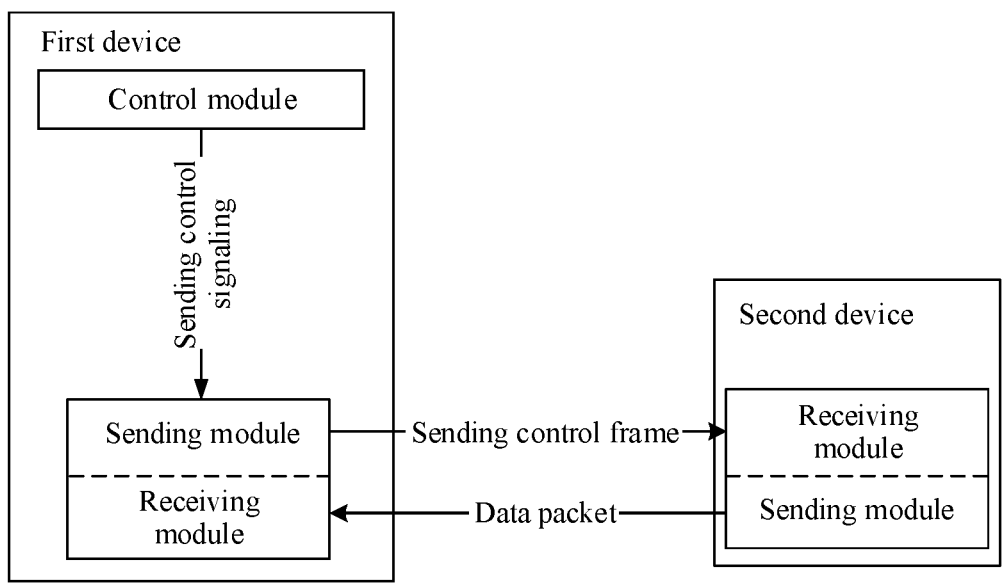
FIG. 10 is a schematic diagram of a system for performing a transmission control method according to this application.

As shown in FIG. 10, a first device communicates with a second device, and the first device is a controller. In this case, a control module is deployed in the first device. FIG. 10 schematically describes as: the control module in the first device generates sending control signaling (for example, the first control signaling and the second control signaling described above), and transmits the control signaling to a sending module through an internal interface; the sending module encapsulates the sending control signaling into a sending control frame and sends the sending control frame to the second device, where the sending control frame may be carried in a control packet for sending; after a receiving module of the second device receives the sending control frame, the sending module of the second device sends a data packet to the first device based on an instruction of the sending control frame. For a format of the sending control frame, refer to FIG. 5 and FIG. 6. It should be understood that the architecture described in FIG. 10 may also be applied to another process, described in this application, in which the first device performs control and the second device returns a packet, for example, a corresponding transmission process in FIG. 9.

In some implementations, the architecture in this application may also be used to control data transmission of a peer device, and a local device is still controlled by using the existing technology.

In conclusion, the control module that executes the control function may be frequently upgraded based on a service requirement, a network environment change, or the like. The control module is deployed or run on a device that can be controlled by a manufacturer or a user. In other words, it can be controlled and designed to specify a device at one end to control packet transmission, to implement fast algorithm conversion, efficient product operation and maintenance, and the like.

Based on the descriptions in this application, a person skilled in the art may design a plurality of formats of a control packet, or may define a plurality of functions for implementing the foregoing functions to be added to a protocol stack or a library. Therefore, a format of a control packet or a format of a function is not limited in this application, and details are not described either.

Figure 11:
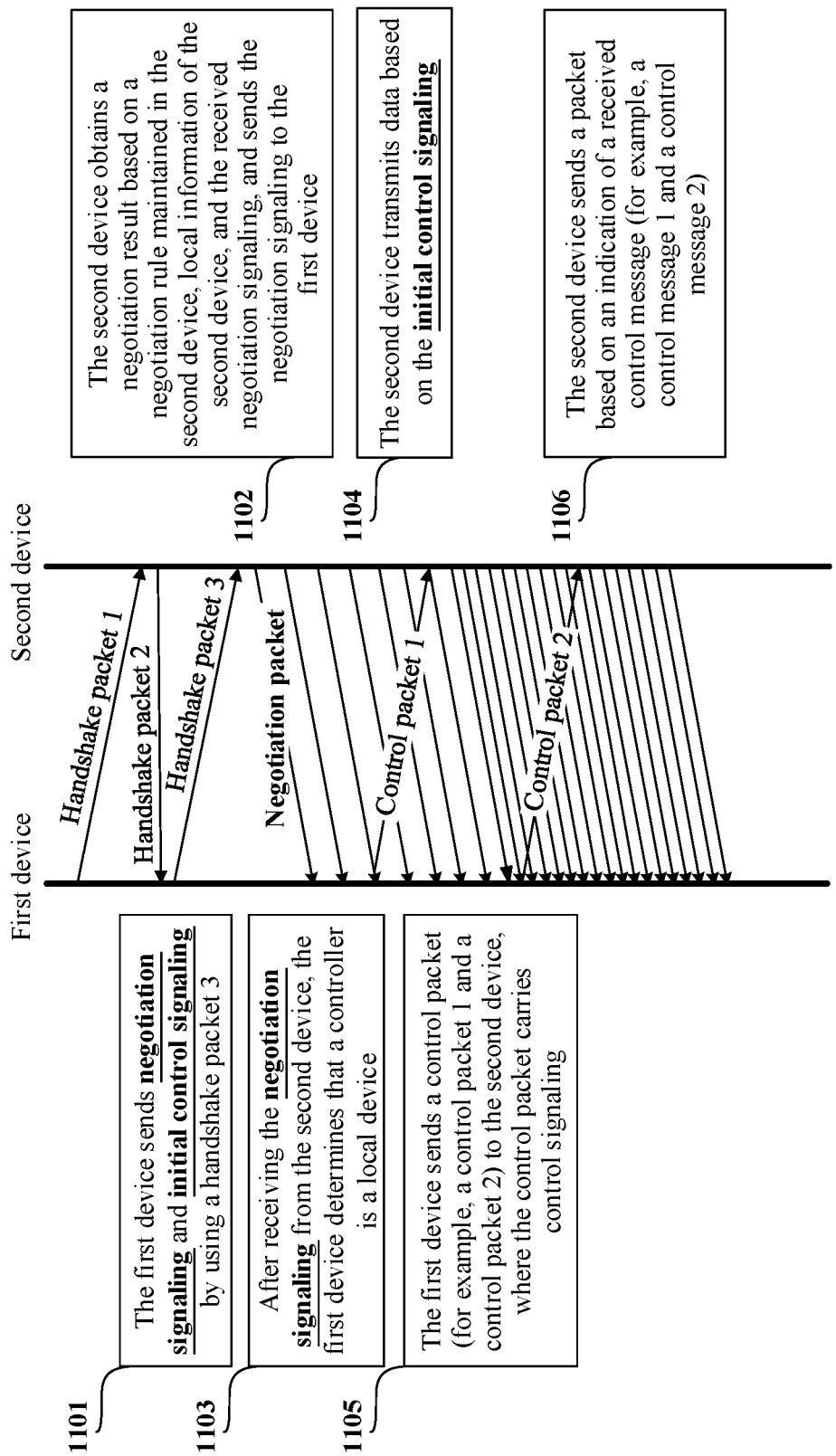
FIG. 11 is a schematic diagram of signaling interaction of a method for negotiating a controller according to this application.

The following uses an example in which negotiation is performed in a link establish phase between a first device and a second device to describe, with reference to FIG. 11, a process of negotiating a controller between two devices. Signaling used in the negotiation process may be carried in a packet in the link establishment phase as a payload. In this way, real-time negotiation can be ensured, and additional transmitted packets may be reduced as much as possible. FIG. 11 not only illustrates a process of negotiating a controller, but also includes a process of controlling transmission of a data packet by using a control packet.

S1101: The first device sends negotiation signaling to the second device.

Optionally, the first device may send the negotiation signaling and initial control signaling at the same time.

The S1101 step may be performed after the first device and the second device mutually perform identity authentication. For example, when the first device and the second device establish a connection for the first time, handshake packets, namely, a handshake packet 1 and a handshake packet 2 in FIG. 11, need to be respectively sent to each other for identity authentication. In this case, the negotiation signaling and the initial control signaling may be used as load of a subsequent handshake packet, namely, a handshake packet 3 in FIG. 11, after the initial two handshake packets, and is encrypted and encapsulated in one packet. The subsequent handshake packet may further include information such as a protocol version, and a key. Certainly, if the first device and the second device have established a connection before, that is, the two parties have authenticated identities, when the first device and the second device establish a link again, the negotiation signaling and the initial control signaling may be carried in load of the transmitted first handshake packet. In FIG. 11, the first device directly sends the handshake packet 3 carrying the two pieces of signaling to the second device.

The negotiation signaling sent by the first device includes a transmission parameter supported by the device and a role parameter used to indicate whether the device is the controller. The transmission parameter includes at least one of a maximum connection quantity supported by the device, a maximum path quantity supported by the device, a length of a data packet, an initial window size, a FEC algorithm supported by the device, a protocol, a version number of a protocol, and the like. The role parameter may be an identifier, a flag, or the like. For example, the role parameter may also be left blank, indicating that a local device is not the controller. A specific form of the role parameter is not limited in this application.

The initial control signaling is the first piece of control signaling sent by the first device to a peer end assuming that the first device is the controller, and is used to control the second device to send a packet. For example, the initial control signaling includes a to-be-transmitted object (for example, a packet sequence number), a transmission mode, and an occasion for sending the to-be-transmitted object. The initial control signaling is sent by the first device, assuming the first device as the controller, when known network information and peer information is relatively little or invalid. For example, the initial control signaling may be sent based on a default setting or a randomly allocated network parameter. The initial control signaling may be the first control signaling described above, namely, one piece of sending control signaling.

In this way, if the second device also determines that the first device is the controller, the second device may send a packet based on the initial control signaling. In this way, packet exchange before data transmission can be reduced as much as possible, and a preparation time before the data transmission can be shortened.

S1102: The second device obtains a negotiation result based on a negotiation rule maintained in the second device, local information of the second device, and the received negotiation signaling, and sends the negotiation signaling to the first device.

In FIG. 11, the negotiation signaling is carried in a negotiation packet.

Similar to the negotiation signaling sent by the first device, the negotiation signaling sent by the second device may carry a transmission parameter supported by the second device and a role parameter used to indicate whether the second device is the controller, so that after receiving the negotiation signaling sent by the second device, the first device determines a negotiation result based on a negotiation rule maintained by the first device, or may carry the negotiation result obtained by the second device. The negotiation result indicates that the controller determined by the second device may be an identity of the first device or the second device. The negotiation signaling sent by the second device may be used as a payload carried in a handshake packet or a control packet that is sent separately.

The local information includes but is not limited to at least one of an application parameter, a data flow parameter, a path parameter, a user parameter, and a physical layer channel parameter. The application parameter refers to an application that establishes a connection on two devices, and includes but is not limited to at least one of a user identifier (UID) and an access domain name.

The data flow parameter is a parameter of at least one data flow accessed by the local device. A data flow parameter of a data flow includes at least one of traffic of the data flow, a data packet size, an arrival interval between data packets, an IP address corresponding to the data flow, and a port number corresponding to the data flow.

The path parameter is a parameter of at least one path accessed by the local device, and includes but is not limited to one or more of the following parameters: a transmission rate, a round trip time (RTT), a packet loss rate, a packet loss range, a jitter, a congestion window (CWND), and bandwidth.

The user parameter includes but is not limited to at least one of a traffic size of a package subscribed by a user using the device and a frequency of using an application corresponding to the connection by the user.

The physical layer channel parameter may be, for example, at least one of Wi-Fi signal strength of the device or information indicating whether an LTE base station in which the device is located is being switched.

The second device may maintain one or more negotiation rules, to help the second device determine the controller. When a plurality of negotiation rules are maintained, an execution priority may exist in the plurality of negotiation rules. Specific content and a form of the negotiation rule are not limited in this application. For ease of understanding, the following briefly lists examples of the negotiation rule.

Negotiation rule 1: For values of some parameters, for example, the length of the data packet and the value of the initial window size in transmission parameters of the peer device and transmission parameters of the local device, an end that has a smaller value is the controller.

Negotiation rule 2: If the negotiation signaling indicates that the peer device is the controller, the local device is a non-controller. However, if the negotiation signaling indicates that the peer device is the controller and a protocol version supported by the peer device is lower than that supported by the local device, the local device is the controller.

If the negotiation signaling indicates that the peer device is the non-controller, the local device is the controller.

S1103: If the negotiation signaling indicates that the peer device is the non-controller and the local device does not support a control function, neither of the two devices is a controller, and an existing transmission protocol, of dual-end control transmission, supported by the two devices is used instead.

If the negotiation result returned by the second device is that the first device is the controller, the second device transmits data based on the received initial control signaling, and the first device controls packet reception and transmission at a local end by using an internal interface function.

If the negotiation result returned by the second device is that the second device is the controller, or the negotiation signaling from the second device includes only the transmission parameter and the role parameter of the second device, the first device determines the controller based on the negotiation signaling received from the second device, local information of the first device, and the negotiation rule. If the first device also determines that the second device is the controller, the second device controls packet transmission of the first device.

Alternatively, the following processing is performed: the controller determined by the first device controls data transmission of the connection.

Alternatively, both the first device and the second device may obtain a result that the local device is the controller, or both the first device and the second device may obtain a result that the local device is not the controller, or a controller obtained through negotiation has no control right. Therefore, in the foregoing three cases, the existing transmission protocol, of dual-end control transmission, supported by the two devices is used instead.

Through the foregoing negotiation process, a controller may be determined at the link establishment phase of the connection based on a specific status of devices and a network. This manner is more flexible and packet exchange in the negotiation process is not performed. This reduces a time of the negotiation process as much as possible, so that a data transmission process may start as soon as possible, and a time of the first device for waiting for data is reduced.

For a specific implementation of controlling, by the second device, packet transmission of the first device, refer to the method procedure and implementation details described above in a case of that the first device is used as the controller, and details are not described herein again.

FIG. 11 schematically describes an example that the first device is the controller after negotiation. That is, after receiving the negotiation signaling sent by the second device, the first device determines that the controller is the local device, as shown in 1103 in FIG. 11. FIG. 11 further describes 1104, that is, the second device transmits data based on the initial control signaling. In addition, 1105 and 1106 are described, that is, the first device sends a control packet (for example, a control packet 1 and a control packet 2) to the second device, where the control message carries control signaling; the second device sends a packet based on an indication of the received control message (for example, the control message 1 and the control message 2). It should be understood that the control message 1 and the control message 2 are used to instruct the second device to continuously send a packet that needs to be transmitted, and the packet is sent after the first device receives the packet from the second device. The control message 1 and the control message 2 may carry any one of the control signaling described above. For a time sequence relationship of steps 1101 to 1106, reference may be made to a packet exchange relationship shown in the figure.

It should be understood that, in a method procedure corresponding to FIG. 9 to FIG. 11, various control packets and responses to the control packets described in corresponding paragraphs in the foregoing (as shown in FIG. 5 to FIG. 8) may be used.

Figure 12:
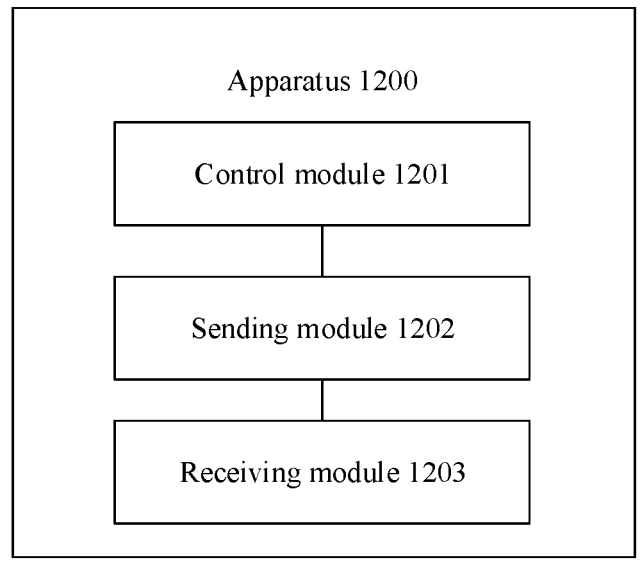
FIG. 12 is a schematic diagram of an apparatus for performing a transmission control method according to this application.
Figure 13:
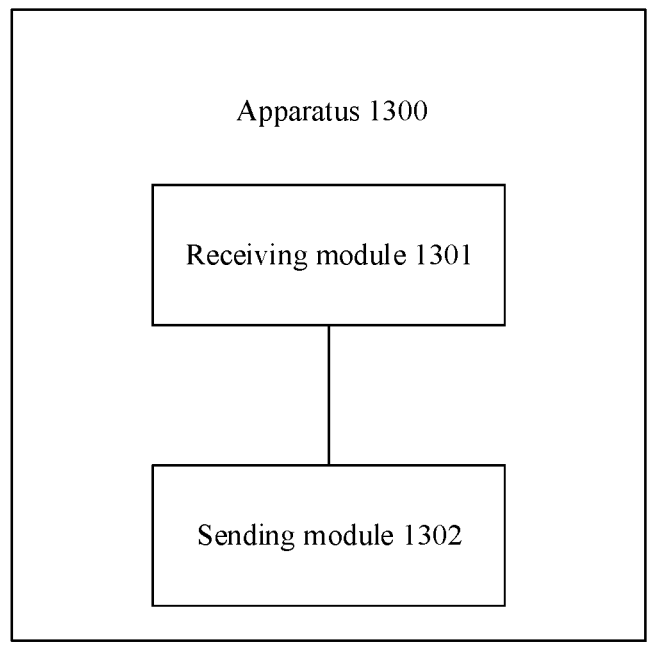
FIG. 13 is a schematic diagram of another apparatus for performing a transmission control method according to this application.

FIG. 12 is a schematic structural diagram of a transmission control apparatus according to an embodiment of the present disclosure. An apparatus 1200 includes a control module 1201, a sending module 1202, and a receiving module 1203. For example, the modules in FIG. 12 may correspond to the modules in the first device shown in FIG. 10. The apparatus 1200 may be run on the first device or the controller described above. Similarly, FIG. 13 is a schematic structural diagram of another transmission control apparatus. An apparatus 1300 includes a receiving module 1301 and a sending module 1302. FIG. 13 may correspond to the second device shown in FIG. 10. The apparatus 1300 may be run on the second device or the controller described above. Therefore, the apparatuses in FIG. 12 and FIG. 13 may perform the transmission control methods described above, for example, the examples described in the paragraphs corresponding to FIG. 9 to FIG. 11. In a process of performing these transmission control methods, various control signaling described above may be used, and these control signaling may use the encapsulation formats described above, such as the examples shown in FIG. 5 to FIG. 8. In addition, in an implementation, the apparatus 1200 and the apparatus 1300 may be implemented by using code of a protocol stack in the operating system shown in FIG. 4.

The following briefly describes several implementations of the apparatus 1200 and the apparatus 1300. For details and technical effects of the following implementations, refer to the foregoing descriptions. Details are not described herein again.

In an implementation, the control module 1201 is configured to generate first control signaling. The sending module 1202 is configured to send the first control signaling to the second device, where the first control signaling instructs the second device to send a first group of data packets, the first control signaling includes a first packet sequence number, a first packet sequence number range, and a first transmission time interval, the first group of data packets are data packets within the first packet sequence number range that start from the first packet sequence number, and the first transmission time interval indicates a time interval for sending the data packets in the first group of data packets. The receiving module 1203 is configured to receive at least one data packet from the second device, where the at least one data packet is a data packet in the first group of data packets.

In an implementation, the control module 1201 is further configured to deliver the first control signaling to the sending module 1202 by using an interface function.

In an implementation, the control module 1201 is further configured to generate second control signaling based on the received first data packet. A packet sequence number of the first data packet is the largest in the at least one data packet. The sending module 1202 is further configured to send the second control signaling, where the second control signaling instructs the second device to send a second group of data packets, the second control signaling includes a second packet sequence number, a range of the second packet sequence number, and a second transmission time interval, the second group of data packets are data packets within the second packet sequence number range starting from the second packet sequence number, the second transmission time interval indicates a time interval for sending the data packets in the second group of data packets, and the second packet sequence number is greater than the packet sequence number of the first data packet.

In an implementation, the first control signaling is encapsulated in a first control frame, and the first control frame includes a type field, an initial packet sequence number field, a packet sequence number range field, and a transmission time interval field, where a value of the type field in the first control frame corresponds to a type of the first control signaling, a value of the initial packet sequence number field in the first control frame indicates the first packet sequence number, a value of the packet sequence number range field in the first control frame indicates range of packet sequence numbers of the first group of data packets, and a value of the transmission time interval field in the first control frame indicates the first transmission time interval.

In an implementation, the sending module 1202 is further configured to send third control signaling to the second device, where the third control signaling includes the first packet sequence number. The receiving module 1203 is further configured to receive a response to the third control signaling from the second device, where the response to the third control signaling includes the first packet sequence number and information about at least one to-be-sent data packet that starts from the first packet sequence number.

In an implementation, the sending module 1202 is further configured to: send a third group of data packets to the second device, where the third group of data packets are data packets that start from a third packet sequence number within a third packet sequence number range; and send fourth control signaling to the second device, where the fourth control signaling includes the third packet sequence number, the third packet sequence number range, and a timestamp, and the timestamp is a system time at which the first device sends the fourth control signaling. The receiving module 1203 is further configured to receive a response to the fourth control signaling from the second device, where the response to the fourth control signaling includes the timestamp, and the response to the fourth control signaling further includes information about a data packet that is received or not received, wherein the data packet is a data packet in the third group of data packets.

The apparatus 1200 may further implement another transmission control in a multipath transmission scenario. In this scenario, the apparatus 1200 is located on a first device, and a connection between the first device and a second device corresponds to a plurality of paths. The apparatus 1200 includes: a control module 1201, configured to generate a first packet, where the first packet includes a dual-path identifier; a sending module 1202, configured to send the first packet to the second device on a first path in the plurality of paths; and a receiving module 1203, configured to: when the dual-path identifier indicates that a packet transmission mode is single-path transmission, receive, on the first path, a packet sent by the second device; or when the dual-path identifier indicates that a packet transmission mode is the multipath transmission, receive, on each of the plurality of paths, a packet sent by the second device.

In an implementation, the control module 1201 is further configured to deliver the first packet to the sending module 1202 by using an interface function.

The multipath transmission is either redundant transmission or aggregated transmission. The dual-path identifier is used to indicate the packet transmission mode of the connection. In this way, in the multipath transmission scenario, a manner of sending data may be indicated to a peer device by using the dual-path identifier.

For the apparatus 1300, in an implementation, the receiving module 1301 is configured to receive first control signaling from a first device, where the first control signaling includes a first packet sequence number, a first packet sequence number range, and a first transmission time interval. The sending module 1302 is configured to send at least one first data packets to the first device based on the first control signaling at the first transmission time interval, where the plurality of first data packets are data packets that start from the first packet sequence number within the first packet sequence number range.

In an implementation, the first control signaling is encapsulated in a first control frame, and the first control frame includes a type field, an initial packet sequence number field, a packet sequence number range field, and a transmission time interval field, where a value of the type field in the first control frame corresponds to a type of the first control signaling, a value of the initial packet sequence number field in the first control frame indicates the first packet sequence number, a value of the packet sequence number range field in the first control frame indicates range of packet sequence numbers of the first group of data packets, and a value of the transmission time interval field in the first control frame indicates the first transmission time interval.

In an implementation, the receiving module 1301 is further configured to receive second control signaling from the first device, where the second control signaling includes a second packet sequence number, a range of the second packet sequence number, and a second transmission time interval, and the second packet sequence number is greater than a packet sequence number of a first packet. The sending module 1302 is further configured to send a plurality of second data packets to the first device based on the second control signaling and the second transmission time interval, where the second data packet is a data packet within the range of the second packet sequence number that starts from the second packet sequence number.

In an implementation, the receiving module 1301 is further configured to receive third control signaling from the first device, where the third control signaling includes the first packet sequence number. The sending module 1302 is further configured to send a response to the third control signaling to the first device, where the response to the third control signaling includes the first packet sequence number and information about at least one to-be-sent data packet that starts from the first packet sequence number.

In an implementation, the receiving module 1301 is further configured to receive at least one third data packet and fourth control signaling from the first device, where the at least one third data packet is a data packet in a third group of data packets, the fourth control signaling includes a third packet sequence number, a third packet sequence number range, and a timestamp, the third group of data packets are data packets that start from the third packet sequence number within the third packet sequence number range, and the timestamp is a system time of the first device when the fourth control signaling is sent. The sending module 1302 is further configured to send a feedback packet of the fourth control signaling to the first device, where the feedback packet includes the timestamp, and the feedback packet further includes information about the at least one third data packet or information about a data packet that is not received in the third group of data packets.

The apparatus 1300 may further implement another transmission control in cooperation with a controller in a multipath transmission scenario. In this scenario, the apparatus 1300 is located in a second device, and a connection between a first device and the second device corresponds to a plurality of paths. The receiving module 1301 is configured to receive a first packet from the first device on a first path in the plurality of paths, where the first packet includes a dual-path identifier, and the dual-path identifier is used to indicate a packet transmission mode of the connection. The sending module 1302 is configured to: when the dual-path identifier indicates that the packet transmission mode is single-path transmission, send, by the second device on the first path, a packet to the first device; or when the dual-path identifier indicates that a packet transmission mode is multipath transmission, send, by the second device on each of the plurality of paths, a packet to the first device.

The multipath transmission is either redundant transmission or aggregated transmission. The dual-path identifier is used to indicate the packet transmission mode of the connection. In this way, in the multipath transmission scenario, a manner of sending data may be indicated to a peer device by using the dual-path identifier.

Figure 14:
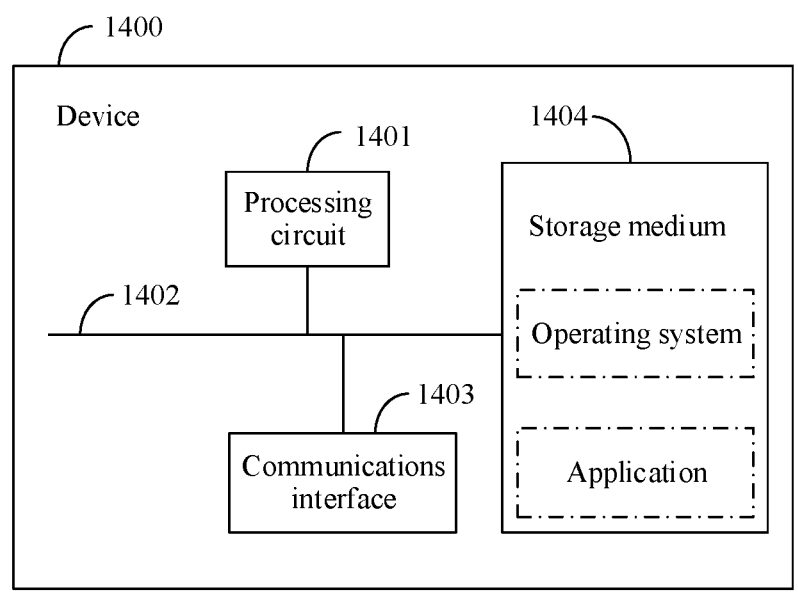
FIG. 14 is a schematic diagram of still another apparatus for performing a transmission control method according to this application.

FIG. 14 is a schematic structural diagram of a device according to an embodiment of the present disclosure. The device described in FIG. 14 may be a terminal, a cloud server, a cloud proxy server, a load balancer, a hybrid access gateway, or the like. The device 1400 includes at least one processing circuit 1401 and a communications interface 1403, where the communications interface 1403 includes at least one physical network interface card, a storage medium 1404, and at least one communications bus 1402. The communications bus 1402 is configured to implement connection and communication between these components. That is, the device that includes a processor, a memory, and a network interface card described in FIG. 4 is a specific implementation of FIG. 14. Therefore, the apparatus in FIG. 14 may perform various transmission control methods described above, for example, the examples described in the paragraphs corresponding to FIG. 9 to FIG. 11. In a process of performing these transmission control methods, various control signaling described above may be used, and these control signaling may use the encapsulation formats described above, such as the examples shown in FIG. 5 to FIG. 8. Therefore, specific implementations, implementation details, and beneficial effects are not described herein again.

In addition, the processing circuit 1401 executes code in the storage medium 1404, and cooperates with the communications interface 1403, to implement the apparatuses corresponding to FIG. 12 and FIG. 13. For example, the sending modules and the receiving modules in the apparatuses 1200 and 1300 may be implemented by the processing circuit 1401 by executing an instruction in the storage medium 1404 and driving the communications interface 1403, and may be specifically implemented by different processes or threads running in the processing circuit 1401 by executing the instruction and therefore invoking the communications interface. The sending module and the receiving module may be a same device (for example, a network interface card) in hardware, and functions of the sending module and the receiving module are implemented by different ports on the device.

In an implementation, the device 1400 may be a terminal device. When the device 1400 is a terminal device, optionally, the device 1400 includes a user interface, and includes a display (for example, a touchscreen, an LCD, a Cathode Ray Tube (CRT) display, a holographic device, or a projector), a keyboard, or a click device (for example, a mouse, a trackball, a touchpad, or a touchscreen). The storage medium 1405 may include a read-only memory and a random access memory, and provide an instruction and data to the processing circuit 1401. A part of the storage medium 1405 may further include a non-volatile random access memory (NVRAM).

When the device is a terminal, a cloud server, or a cloud proxy server, the storage medium 1405 stores the following elements: an executable module or a data structure, or a subset thereof, or an extended set thereof; an operating system including various system programs, such as a framework layer, a kernel library layer, and a driver layer, and configured to implement various basic services and process a hardware-based task; and an application program including various applications, such as a launcher, a media player, a browser, and the like, and configured to implement various application services. When the device is a gateway, the storage medium 1405 may store only program code required for performing the foregoing method (for example, including receiving or sending a data packet, receiving or sending an acknowledgement packet, and analyzing a received data packet or analyzing a received acknowledgement packet).

The processing circuit 1401 may be implemented by using one or more processors, and the processing circuit 1401 may be a central processing unit (CPU). Alternatively, the processing circuit 1401 may be another general purpose processor, a digital signal processor (DSP), an application-specific integrated circuit (ASIC), a field programmable gate array (FPGA) or another programmable logic device, a discrete gate or a transistor logic device, a discrete hardware assembly, or the like. The general purpose processor may be a microprocessor, or the processor may be any conventional processor or the like.

The communications bus 1402 may include a data bus, a power supply bus, a control bus, a status signal bus, and the like. For clear description in this embodiment, various buses are marked as the communications bus 1402 in FIG. 14.

The communications interface 1403 may be specifically a communications interface on a physical machine. The communications interface may be a wireless communications interface. For example, the wireless communications interface may be a wireless module or a network interface card of the physical machine. The processing circuit 40 receives data from or sends data to another device such as another physical machine by using the communications interface 1403.

The storage medium 1404 may include a volatile memory, for example, a random access memory (RAM); or the storage medium 1404 may include a non-volatile memory, such as a read-only memory (ROM), a flash memory (, a hard disk drive (HDD), or a solid-state drive (SSD); or the storage medium 1404 may include a combination of the foregoing types of memories.

The storage medium 1404 may include an underlying storage medium and a memory. The underlying storage medium may be, for example, a storage medium in a network interface card. The memory is coupled to the underlying storage medium, and is configured to serve as a cache of the underlying storage medium.

This application further provides a readable storage medium. The readable storage medium includes a computer executable instruction. When a physical machine is run, a processor of the physical machine executes the computer executable instruction, so that the physical machine performs any one of the methods provided in the embodiments of the present disclosure.

Optionally, the readable storage medium in this embodiment may be the storage medium 1404 shown in FIG. 14.

This application further describes a computer program product, where the computer program product includes an instruction, and when the instruction is run on a computer, the computer performs any one of the methods described in this application.

The foregoing descriptions about implementations allow a person skilled in the art to understand that, for the purpose of convenient and brief description, division of the foregoing function modules is used as an example for illustration. In actual application, the foregoing functions can be allocated to different function modules for implementation according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the embodiments provided in this application, it should be understood that the disclosed device, apparatus, and method may be implemented in other manners. For example, the described apparatus embodiments are merely examples. For example, division into the modules is merely logical function division and may be other division in actual implementation. For example, a plurality of units or components may be combined or integrated into another system, or some features may be ignored or not performed. For example, the sending module 1202 and the receiving module 1203 may be a module, for example, a transceiver module or a transceiver. In addition, the displayed or discussed mutual couplings or direct couplings or communication connections may be implemented through some interfaces, for example, the interface function mentioned above, indirect couplings or communication connections between the apparatuses or units may be implemented in an electrical form, a mechanical form, or another form.

When software is used to implement the foregoing embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD), a phase change memory), or the like.

The foregoing is the methods and apparatuses provided in the embodiments of the present disclosure. Descriptions of the foregoing embodiments are merely intended to help understand the methods of the present disclosure. In addition, a person of ordinary skill in the art may, based on the content disclosed in the present disclosure, make modifications with respect to a specific implementation and an application scope. Therefore, the content of this specification shall not be construed as a limitation to the present disclosure.

What is claimed is:

1. A method for transmission control, comprising:
    sending, by a first device to a second device, first control signaling that instructs the second device to send a first group of data packets, the first control signaling comprises a first packet sequence number, a first packet sequence number range, and a first transmission time interval, the first group of data packets correspond to sequence numbers within the first packet sequence number range starting from the first packet sequence number, and the first transmission time interval indicates a time interval for sending data packets of the first group of data packets, wherein the first control signaling is encapsulated in a first control frame, the first control frame is encapsulated in a first control packet, the first control frame carries a third flow identifier, the first control packet further comprises a fifth control frame, a fifth control signaling is encapsulated in the fifth control frame, the fifth control signaling instructs the second device to send a fifth group of data packets, and the fifth control frame carries a fourth flow identification number; and
    receiving, by the first device from the second device, at least one data packet in the first group of data packets.

2. The method according to claim 1, further comprising:
    sending, by the first device, second control signaling based on a first data packet of the at least one data packet received from the second device, wherein the first data packet corresponds to a largest packet sequence number in the at least one data packet, the second control signaling instructs the second device to send a second group of data packets, the second control signaling comprises a second packet sequence number, a second packet sequence number range, and a second transmission time interval, the second group of data packets correspond to sequence numbers that start from the second packet sequence number within the second packet sequence number range, the second transmission time interval indicates a time interval for sending data packets of the second group of data packets, and the second packet sequence number is greater than a packet sequence number of the first data packet.

3. The method according to claim 1, wherein the first control frame comprises a type field, an initial packet sequence number field, a packet sequence number range field, and a transmission time interval field, wherein a value of the type field in the first control frame corresponds to a type of the first control signaling, a value of the initial packet sequence number field in the first control frame indicates the first packet sequence number, a value of the packet sequence number range field in the first control frame indicates a range of packet sequence numbers of the first group of data packets, and a value of the transmission time interval field in the first control frame indicates the first transmission time interval.

4. The method according to claim 1, wherein the method further comprising:
    after receiving the at least one data packet from the second device, sending, by the first device, third control signaling to the second device, wherein the third control signaling comprises the first packet sequence number; and
    receiving, by the first device, a response to the third control signaling from the second device, wherein the response to the third control signaling comprises the first packet sequence number and information about at least one data packet that corresponds to at least one packet sequence number that starts from the first packet sequence number.

5. The method according to claim 4, wherein the first group of data packets comprise a first flow identifier number, and wherein each of a packet that comprises the first control signaling, a packet that comprises second control signaling, a packet that comprises the third control signaling, and a packet that comprises the response to the third control signaling, comprises a second flow identifier number.

6. The method according to claim 1, wherein the method further comprises:
    sending, by the first device, a third group of data packets to the second device, wherein the third group of data packets correspond to sequence numbers that start from a third packet sequence number within a third packet sequence number range;
    sending, by the first device, fourth control signaling to the second device, wherein the fourth control signaling comprises the third packet sequence number, the third packet sequence number range, and a timestamp corresponding to a system time at which the first device sends the fourth control signaling; and
    receiving, by the first device, a response to the fourth control signaling from the second device, wherein the response to the fourth control signaling comprises the timestamp and information about whether a data packet is received or not received, wherein the received or not received data packet is a data packet in the third group of data packets.

7. The method according to claim 6, wherein the fourth control signaling is encapsulated in a fourth control frame, the fourth control frame comprises a type field, an initial packet sequence number field, a packet sequence number range field, and a timestamp field, wherein a value of the type field in the fourth control frame corresponds to a type of the fourth control signaling, a value of the initial packet sequence number field in the fourth control frame indicates the third packet sequence number, and a value of the packet sequence number range field in the fourth control frame indicates a range of packet sequence numbers of the third group of data packets.

8. A method for transmission control, comprising:
receiving, by a second device, first control signaling from a first device, wherein the first control signaling comprises a first packet sequence number, a first packet sequence number range that starts from the first packet sequence number, and a first transmission time interval; and
sending, by the second device, a first group of data packets to the first device based on the first control signaling at the first transmission time interval, wherein the first group of data packets correspond to sequence numbers within the first packet sequence number range, wherein the first control signaling is encapsulated in a first control frame, the first control frame is encapsulated in a first control packet, the first control frame carries a third flow identifier, the first control packet further comprises a fifth control frame, a fifth control signaling is encapsulated in the fifth control frame, the fifth control signaling instructs the second device to send a fifth group of data packets, and the fifth control frame carries a fourth flow identification number.

9. The method according to claim 8, wherein the first control frame comprises a type field, an initial packet sequence number field, a packet sequence number range field, and a transmission time interval field, wherein a value of the type field in the first control frame indicates a type of the first control signaling, a value of the initial packet sequence number field in the first control frame indicates the first packet sequence number, a value of the packet sequence number range field in the first control frame indicates a range of packet sequence numbers of the first group of data packets, and a value of the transmission time interval field in the first control frame indicates the first transmission time interval.

10. The method according to claim 8, wherein the method further comprising:
after sending the first group of data packet to the first device, receiving, by the second device, second control signaling from the first device, wherein the second control signaling comprises a second packet sequence number, a second packet sequence number range, and a second transmission time interval, the second packet sequence number is greater than a packet sequence number of a first data packet; and
sending, by the second device, a plurality of second data packets to the first device based on the second control signaling at the second transmission time interval, wherein the plurality of second data packets are data packets within the second packet sequence number range.

11. The method according to claim 8, wherein the method further comprises:
receiving, by the second device, third control signaling from the first device, wherein the third control signaling comprises the first packet sequence number; and
sending, by the second device, a response to the third control signaling to the first device, wherein the response to the third control signaling comprises the first packet sequence number and information about at least one data packet that corresponds to at least one packet sequence number that starts from the first packet sequence number.

12. A device for transmission control, comprising:
at least one processor; and
a non-transitory computer-readable storage medium coupled to the at least one processor and storing programming instructions for execution by the at least one processor, the programming instructions instruct the at least one processor to perform operations comprising:
sending, first control signaling to a second device that instructs the second device to send a first group of data packets, the first control signaling comprises a first packet sequence number, a first packet sequence number range, and a first transmission time interval, the first group of data packets correspond to sequence numbers within the first packet sequence number range starting from the first packet sequence number, and the first transmission time interval indicates a time interval for sending data packets of the first group of data packets, wherein the first control signaling is encapsulated in a first control frame, the first control frame is encapsulated in a first control packet, the first control frame carries a third flow identifier, the first control packet further comprises a fifth control frame, a fifth control signaling is encapsulated in the fifth control frame, the fifth control signaling instructs the second device to send a fifth group of data packets, and the fifth control frame carries a fourth flow identification number; and
receiving, from the second device, at least one data packet in the first group of data packets.

13. The device according to claim 12, wherein the operations further comprising:
sending, second control signaling based on a first data packet of the at least one data packet received from the second device, wherein the first data packet corresponds to a largest packet sequence number of the received first data packet is the largest in the at least one data packet, the second control signaling instructs the second device to send a second group of data packets, the second control signaling comprises a second packet sequence number, a second packet sequence number range, and a second transmission time interval, the second group of data packets correspond to sequence numbers that start from the second packet sequence number within the second packet sequence number range, the second transmission time interval indicates a time interval for sending data packets of the second group of data packets, and the second packet sequence number is greater than a packet sequence number of the received first data packet.

14. The device according to claim 12, wherein the first control frame comprises a type field, an initial packet sequence number field, a packet sequence number range field, and a transmission time interval field, wherein a value of the type field in the first control frame corresponds to a type of the first control signaling, a value of the initial packet sequence number field in the first control frame indicates the first packet sequence number, a value of the packet sequence number range field in the first control frame indicates a range of packet sequence numbers of the first group of data packets, and a value of the transmission time interval field in the first control frame indicates the first transmission time interval.

15. The device according to claim 12, the operations further comprising:

after receiving the at least one data packet from the second device, sending, third control signaling to the second device, wherein the third control signaling comprises the first packet sequence number; and receiving, a response to the third control signaling from the second device, wherein the response to the third control signaling comprises the first packet sequence number and information about at least one data packet that corresponds to at least one packet sequence number that starts from the first packet sequence number.

16. A non-transitory computer-readable storage medium storing one or more instructions executable by at least one processor to perform operations comprising:

receiving, first control signaling from a first device, wherein the first control signaling comprises a first packet sequence number, a first packet sequence number range, and a first transmission time interval; and sending, a first group of data packets to the first device based on the first control signaling at the first transmission time interval, wherein the first group of data packets correspond to sequence numbers within the first packet sequence number range starting from the first packet sequence number, wherein the first control signaling is encapsulated in a first control frame, the first control frame is encapsulated in a first control packet, the first control frame carries a third flow identifier, the first control packet further comprises a fifth control frame, a fifth control signaling is encapsulated in the fifth control frame, the fifth control signaling instructs a second device to send a fifth group of data packets, and the fifth control frame carries a fourth flow identification number.

17. The non-transitory computer-readable storage medium according to claim 16, wherein the first control frame comprises a type field, an initial packet sequence number field, a packet sequence number range field, and a transmission time interval field, wherein a value of the type field in the first control frame indicates a type of the first control signaling, a value of the initial packet sequence number field in the first control frame indicates the first packet sequence number, a value of the packet sequence number range field in the first control frame indicates a range of packet sequence numbers of the first group of data packets, and a value of the transmission time interval field in the first control frame indicates the first transmission time interval.

18. The non-transitory computer-readable storage medium according to claim 16, the operations further comprising:

after sending the first group of data packet to the first device, receiving, second control signaling from the first device, wherein the second control signaling comprises a second packet sequence number, a second packet sequence number range, and a second transmission time interval, the second packet sequence number is greater than a packet sequence number of a first data packet; and sending, a plurality of second data packets to the first device based on the second control signaling at the second transmission time interval, wherein the plurality of second data packets correspond to sequence numbers within the second packet sequence number range starting from the second packet sequence number.

19. The non-transitory computer-readable storage medium according to claim 16, wherein the operations further comprising:

receiving, third control signaling from the first device, wherein the third control signaling comprises the first packet sequence number; and sending, a response to the third control signaling to the first device, wherein the response to the third control signaling comprises the first packet sequence number and information about at least one data packet that corresponds to at least one packet sequence number that starts from the first packet sequence number.

\* \* \* \* \*